(12) United States Patent
Surma et al.

(10) Patent No.: US 8,233,785 B1
(45) Date of Patent: Jul. 31, 2012

(54) PHOTOGRAPHY STATION

(75) Inventors: Michael John Surma, Eagan, MN (US); Richard Lee Swanson, Hopkins, MN (US); Earl John Adolphi, Los Lunas, NM (US); Brent Peterson, Excelsior, MN (US)

(73) Assignee: Lifetouch Inc., Eden Prairie, MN (US)

( * ) Notice: Subject to any disclaimer, the term of this patent is extended or adjusted under 35 U.S.C. 154(b) by 386 days.

(21) Appl. No.: 12/561,177

(22) Filed: Sep. 16, 2009

(51) Int. Cl.
*G03B 15/00* (2006.01)

(52) U.S. Cl. .......................................... 396/1

(58) Field of Classification Search .................. 396/1–4
See application file for complete search history.

(56) References Cited

U.S. PATENT DOCUMENTS

| 5,343,386 | A  | * | 8/1994 | Barber | 700/90 |
| 5,508,774 | A  | * | 4/1996 | Klees | 396/1 |
| 7,177,537 | B1 | * | 2/2007 | Adolphi et al. | 396/4 |
| 2003/0026605 | A1 | * | 2/2003 | Misumi et al. | 396/1 |
| 2008/0226273 | A1 | * | 9/2008 | Kaku | 396/3 |
| 2008/0246777 | A1 |   | 10/2008 | Swanson et al. | |

* cited by examiner

*Primary Examiner* — W. B. Perkey
(74) *Attorney, Agent, or Firm* — Merchant & Gould P.C.

(57) ABSTRACT

A photography station operates to capture digital images of a subject with at least one digital camera. The photography station includes foreground lighting and background lighting. The foreground lighting is configured to illuminate the subject, while the background lighting is configured to illuminate a background. The photography station includes a computing device having a setup module operable to perform tests to check a configuration of the photography station, and a photography module operable to capture digital images of the subject with the digital camera. In some embodiments, the tests performed by the setup module include a plurality of initial checking operations and a plurality of background processing operations.

19 Claims, 33 Drawing Sheets

PHOTOGRAPHY STATION

TECHNICAL FIELD

This disclosure relates generally to the field of digital photography, and more particularly to portrait photography, and more particularly still to a photography station for capturing images of a subject.

BACKGROUND

Portrait photographs are often taken in a portrait studio. Such a studio often includes a variety of decorative background images that can be arranged behind a subject, and one or more lighting units that illuminate the subject. A film or digital camera is used to capture the subject's image while the subject is posing in the portrait studio.

When images are captured in the portrait studio, all of the various components must be operating properly or the quality of the resulting photographs will be compromised. Due to the relatively large number of components in such a studio, it is possible that a problem with the portrait studio components may go unnoticed by the photographer. In most cases, such a problem results in photographs that are of insufficient quality, and requires that all of the pictures that were taken with the faulty component will need to be retaken. Accordingly, it is desirable to identify any such problems prior to a photography session so that the problems can be resolved before the photographs are taken.

One partial solution is to design a photography studio including smart components. In this example, each component has a control system that monitors the status of the respective component and communicates the status to other components. While such a system would overcome some of the problems, there would also be several drawbacks. For example, such as system would be complicated and expensive to design and manufacture. Further, unless extremely sophisticated control systems were designed, such smart components may not identify all possible failures. For example, a smart lighting system may be configured to communicate a message whenever the light is triggered, but may not reveal that the light is pointing in a wrong direction.

Although a dedicated photography studio can have a carefully controlled environment, portable photography studios are typically placed in environments such as a school or other building that can have very different characteristics, such as different colored rooms and different lighting conditions. As a result, if a first set of photographs is taken at one location and another set of photographs is taken at another location, the characteristics of the resulting photographs can also have wide variability and lack consistency.

For example, if the first location has bright red walls, the resulting photographs may have a red tint. A second location that does not have red walls will result in photographs that do not have the red tint. If the first location is bright and the second location is dark, the resulting photographs will similarly lack consistency. If the photographs are subsequently combined into a single product, such as a picture book or other composite product where the photographs from each location may be visible at the same time, the variability of these characteristics of the photographs can be very noticeable and undesirable. Further, subsequent processing of the digital images to attempt to manually correct for such differences one-by-one is difficult and time consuming.

Therefore, there is a need for a system and method of capturing photographs that overcomes the deficiencies of the prior art.

SUMMARY

In general terms, this disclosure relates to the field of digital photography, and more particularly to portrait photography, and more particularly still to a photography station for capturing images of a subject.

One aspect is a photography station comprising: a background; a background light arranged and configured to illuminate the background; a foreground light arranged and configured to illuminate a subject; a digital camera configured to capture digital images of the subject and the background; a controller coupled to the background light, the foreground light, and the digital camera for synchronized operation; and a computing device electrically coupled to the controller, the computing device including a processor and memory, the memory storing computer-executable instructions, which when executed by the processor generate modules including: a setup module operable to perform tests on test images captured by the digital camera to check a configuration of the photography station, wherein each test includes an initial checking operation and a background processing operation, and wherein at each of the initial checking operations are performed consecutively, and wherein the background processing operations are performed substantially simultaneous to at least some of the initial processing operations; and a photography module operable to capture digital images of the subject.

Another aspect is a method of checking a configuration of a photography station, the method comprising: performing a first test, the first test comprising: generating a first user interface with a computing device, the first user interface prompting a user to perform at least one first action; capturing with a digital camera at least one first test image after the at least one first action; performing a first initial check of the at least one first test image; and if the first initial check is completed successfully, performing further processing of the at least one first test image; and performing a second test, the second test comprising: generating a second user interface with the computing device before the further processing of the at least one first test image is completed, the second user interface prompting the user to perform at least one second action; capturing with the digital camera at least one second test image after the at least one second action; performing a second initial check on the at least one second test image; and if the second initial check is completed successfully, performing further processing of the at least one second test image.

A further aspect is a method of checking a position of a subject in a digital image, the method comprising: capturing a first digital image of the subject with a digital camera; identifying with a computing device a top point of the subject in the first digital image; and determining with the computing device whether the top point is within a predetermined range of permissible locations within the digital image.

Yet another aspect is a method of quality checking a digital image containing a subject, the method comprising: obtaining a digital image; identifying a plurality of dark pixels within the digital image; determining whether any of the plurality of dark pixels is at an edge of the digital image; and if any of the plurality of dark pixels is at the edge, determining that the subject is incorrectly positioned.

DETAILED DESCRIPTION

Figure 1:
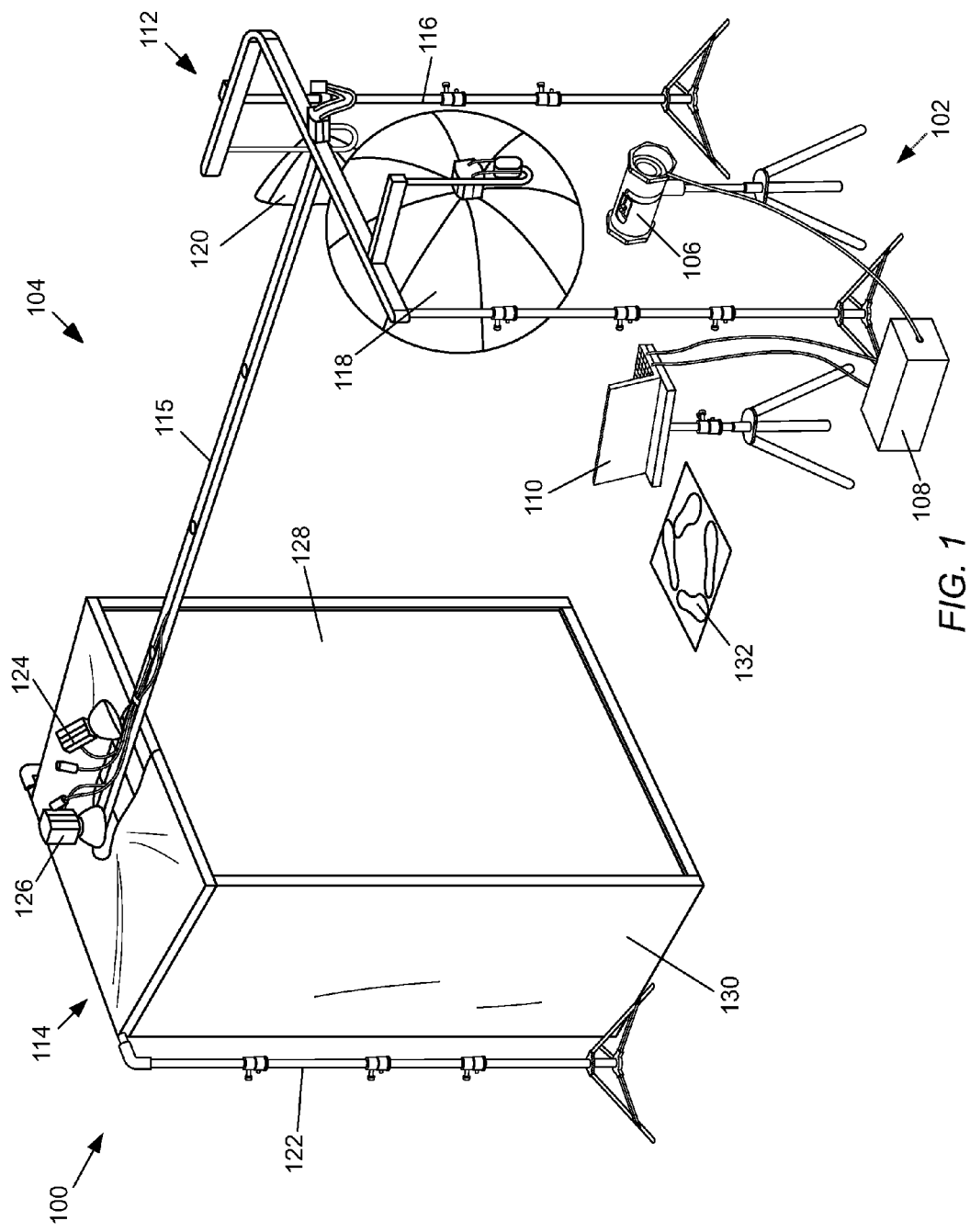
FIG. 1 is a schematic perspective diagram of an example photography station according to the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
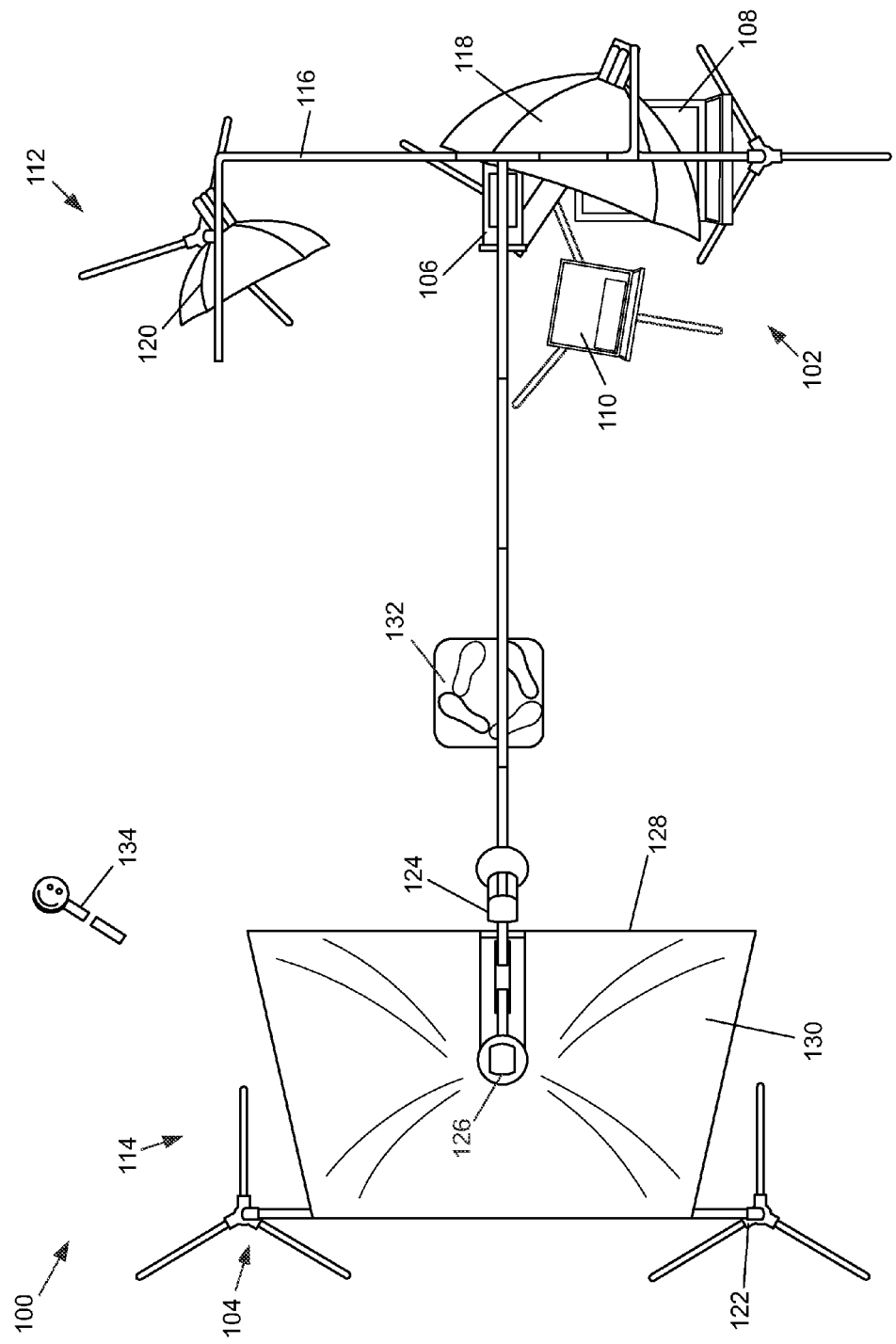
FIG. 2 is a schematic top plan view of the photography station shown in FIG. 1.
Figure 3:
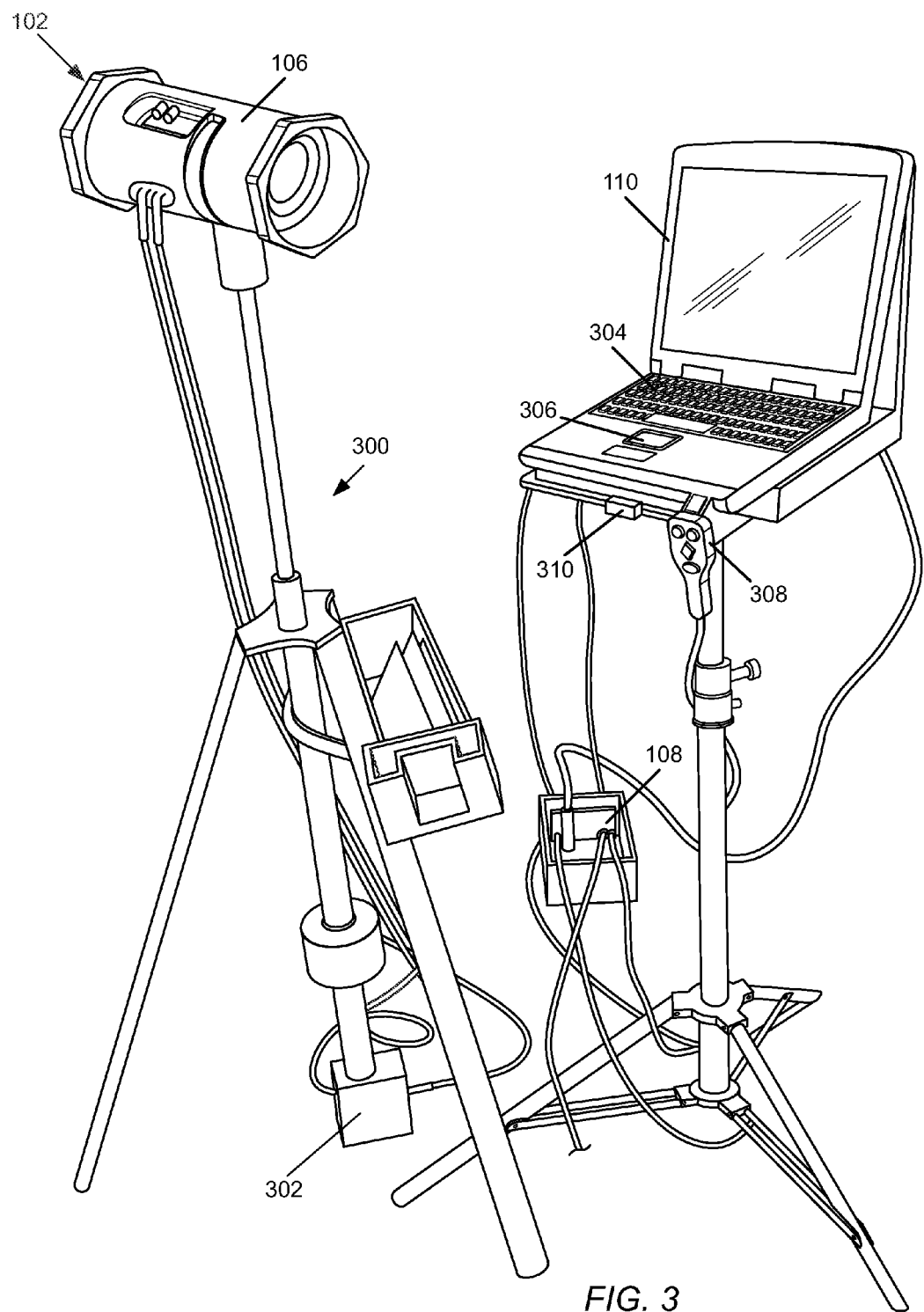
FIG. 3 is a schematic perspective view of an image capture and control system of the photography station shown in FIG. 1.

FIGS. 1-3 show various view of an example photography station 100. FIG. 1 is schematic perspective diagram of the photography station 100. FIG. 2 is a top plan view of an example photography station 100. FIG. 3 is a perspective view of an image capture and control system 102 of the photography station 100.

In one example, photography station 100 includes image capture and control system 102 and station assembly 104. In some embodiments, the image capture and control system 102 includes camera 106, controller 108, and computing device 110. In some embodiments, the station assembly 104 includes a forward portion 112 and a rearward portion 114. The forward portion includes, for example, stand 116 that supports main light 118 and fill light 120. Rearward portion 114 includes, for example, stand 122 that supports hair light 124, background light 126, background 128, and tent 130. Some embodiments further include position markers, such as posing position mat 132 and waiting line mat 134.

Image capture and control system 102 operates, in some embodiments, to control the overall operation of photography station 102. For example, in some embodiments image capture and control system 102 performs setup checks to ensure that photography station 100 is properly setup, capture digital images of a subject, and to monitor the operation of photography station 100 while images are being captured to alert the photographer to potential problems.

Camera 106 is typically a digital camera that operates to capture digital images of one or more subjects. An example of camera 106 is described in more detail herein with reference to FIG. 4.

As shown in FIG. 3, camera 106 is typically mounted on a tripod 300 or other support structure. In some embodiments the height of camera 106 is adjusted by a motor 302 coupled to a shaft of the tripod. When the motor rotates, the shaft of the tripod extends or contracts to raise or lower the camera 106. In some embodiments the camera 106 is mounted to the shaft at a fixed and non-variable angle relative to the vertical shaft of tripod 300.

Controller 108 operates to control and coordinate the operation of various components of photography station 100. An example of controller 108 is described in more detail with reference to FIG. 5.

In this example, the controller 108 is electrically connected to camera 106 (including tripod motor 302, shown in FIG. 3), computing device 110, and lights 118, 120, 124, and 126, such as via one or more wires or data communication cables.

In another possible embodiment, wireless communication is used to communicate between a wireless communication device of controller 108 and a wireless communication device of one or more of camera 106 and lights 118, 120, 124, and 126. An example of a wireless communication protocol is the 802.11a/b/g/n communication protocol. Other embodiments use a custom wireless communication protocol. Wireless communication includes radio frequency communication, infrared communication, magnetic induction communication, or other forms of wireless data communication.

Computing device 110 operates, in some embodiments, to interface with a user, such as the photographer. An example of computing device 110 is described in more detail with reference to FIG. 6. In some embodiments, computing device 110 generates a graphical user interface, such as to provide instructions to the user, warn the user of potential problems, display a live video feed preview from camera 106, and display an image after it has been captured.

The computing device 110 also operates to receive input from the user in some embodiments. As shown in FIG. 3, some embodiments include keyboard 304, touch pad 306, remote control 308, and barcode scanner 310 that receive input from the user.

In some alternate embodiments, one or more of camera 106, controller 108, and/or computing device 110 are a single device. For example, in some embodiments camera 106 and controller 108 are configured as a single device that captures digital images and performs control operations of controller 108. In another possible embodiment, controller 108 and computing device 110 are a single device. In yet another possible embodiment, camera 106, controller 108, and computing device 110 are all a single device. Other combinations are used in other embodiments. Further, in yet other embodiments additional devices are used to perform one or more functions of these devices.

In some embodiments, station assembly 104 generally includes forward portion 112 and rearward portion 114. Forward portion 112 is configured to be positioned in front of the subject when an image of a subject is captured. Rearward portion 114 is configured to be positioned behind the subject when an image of the subject is captured. In some embodiments a posing position mat 132 is provided to identify the location where a subject should be positioned while an image is captured.

In some embodiments a rigid alignment member 115 is provided, which is connected to and between forward portion 112 and rearward portion 114. The rigid alignment member 115 has a predetermined length that ensures that forward portion 112 is positioned a proper distance away from rearward portion 114. Further, in some embodiments the alignment member 115 is configured to connect at a desired angle (i.e., 90°) to properly align the forward portion 112 with the rearward portion 114.

In this example, forward portion 112 includes a stand 116 that supports a main light 118 and a fill light 120. Other embodiments include more or fewer lights. In some embodiments the main and fill lights 118 and 120 include a flash bulb and a diffuser that surrounds the bulb. Lights 118 and 120 are synchronized and controlled by controller 108.

Rearward portion 114 includes, for example, stand 122 that supports hair light 124, background light 126, background 128, and tent 130. Hair light 124 is typically arranged above and behind the subject to illuminate the top of the subject's head. Background light 126 is provided to illuminate background 128. In this example, background light 126 is arranged behind background 128. In another possible embodiment, background light 126 is arranged forward of background 126. Background light 126 is preferably arranged so that it does not significantly illuminate a side of the subject that is facing camera 106.

Background 128 is typically a sheet of one or more materials that is arranged behind the subject while an image of the subject is captured. In some embodiments background 128 is translucent, such that at least some of the light from background light 126 is allowed to pass through. Typically background 128 has a monochromatic color. In a preferred embodiments background 128 has a color, such as gray, that does not substantially add color to the subject in a digital image. Preferably background 128 has no visible pattern or fabric texture. An example of a suitable material is a rear projection screen material. Other embodiments illuminate background 128 from the front (but behind the subject), such that background 128 need not be translucent. An example of a suitable background 128 material for front illumination is a front projection screen material.

Tent 130 is provided in some embodiments to form an enclosure behind background 128. Tent 130 prevents most of the light from background light 126 from illuminating behind or to the sides of rearward portion 114 and directs the light to background 128. In some embodiments an inner surface of tent 130 is a light color, while the outer surface of tent 130 is a dark color. In some embodiments the outer surface of tent 130 forms a small dark border around background 128. The border region is used in some embodiments discussed herein to detect a misalignment of camera 106 with respect to background 128.

Some embodiments include a positing position mat 132 that identifies the preferred location of a subject while an image is captured. Some embodiments also include a waiting line mat 134 (shown in FIG. 2) that identifies the preferred location for a person to stand while the person is waiting for his or her picture to be taken. For example, in some embodiments the photography station 100 is used to take the photographs of a large number of people, such as in a school, business, church, and the like where a line of people may be waiting to have their pictures taken. The waiting line mat 134 identifies for those people where they should wait to be out of the view of camera 106 and to avoid interfering with lights 118 or 120.

Figure 4:
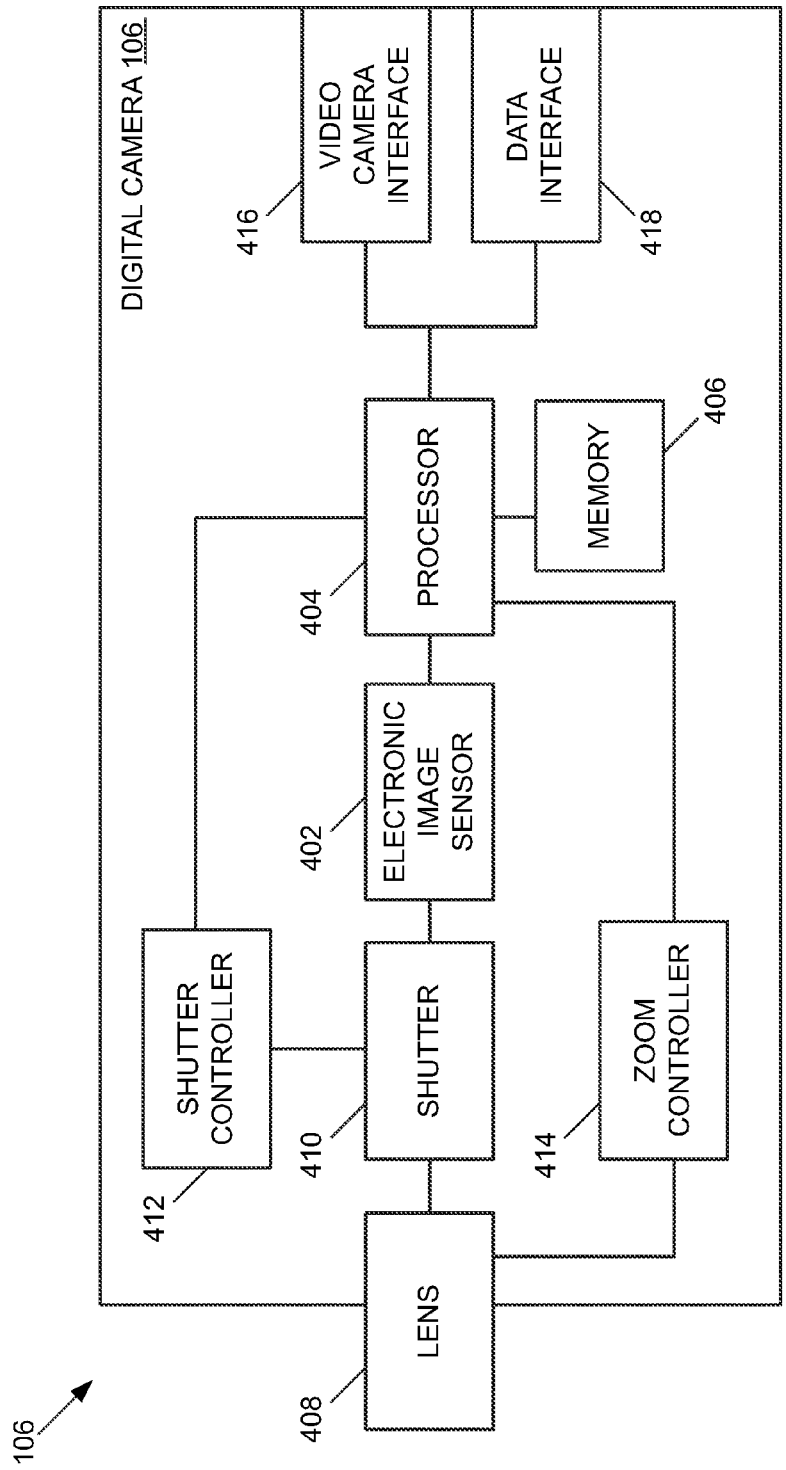
FIG. 4 is a schematic block diagram of an example camera of the photography station shown in FIG. 1.

FIG. 4 is a schematic block diagram of an example camera 106. Camera 106 is typically a digital camera including at least an electronic image sensor 402 for converting an optical image to an electric signal, a processor 404 for controlling the operation of the camera 106, and memory 406 for storing the electric signal in the form of digital image data.

An example of electronic image sensor 402 is a charge-coupled device (CCD). Another example of electronic image sensor 402 is a complementary metal-oxide-semiconductor (CMOS) active-pixel sensor. Electronic image sensor 402 receives light from a subject and background and converts the received light into electrical signals. The signals are converted into a voltage, which is then sampled, digitized, and stored as digital image data in memory 406.

Memory 406 can include various different forms of computer readable storage media, such as random access memory. In some embodiments memory 406 includes a memory card. A wide variety of memory cards are available for use in various embodiments. Examples include: a CompactFlash (CF) memory card (including type I or type II), a Secure Digital (SD) memory card, a mini Secure Digital (miniSD) memory card, a micro Secure Digital (microSD) memory card, a smart media (SM/SMC) card, a Multimedia Card (MMC), an xD-Picture Card (xD), a memory stick (MS) including any of the variations of memory sticks, an NT card, and a USB memory stick (such as a flash-type memory stick). Other embodiments include other types of memory, such as those described herein, or yet other types of memory.

In some embodiments, camera 106 includes three main sections: lens 408, a mechanical shutter 410, and a CCD element 402. Generally, CCD elements 402 have relatively rapid exposure speeds. However, the process of moving the captured image from the CCD element 402 to an image storage area such as memory 406 is slower than the time to acquire the image. Accordingly, in order to reduce the time between acquiring the backlit and front-lit images as discussed herein—preferably to further reduce any motion of the foreground object in the time period between shots—some embodiments include a CCD element 402 that is an interline transfer CCD. Such elements are commercially available, and are manufactured by Eastman Kodak Company of Rochester, N.Y. under the designation KAI-11000. This type of CCD element 402 includes arrays of photodiodes interspaced with arrays of shift registers. In operation, after capturing a first image, photodiodes transfer the electrons to the adjacent shift registers and become ready thereafter to capture the next image. Because of the close proximity between the photodiodes and associated shift registers, the imaging-transfer cycles can be very short. Thus, in some embodiments digital camera 106 can rapidly capture a first image, transfer the first image to a memory 406 (where it is temporarily stored) and then capture a second image. After the sequence of images, both of the images can be downloaded to the appropriate longer term memory location, such as a second memory device 406.

Since CCD element 402 continues to integrate the second image while the first image is read out, a shutter 410 is employed in front of the CCD element 402. In some embodiments, a mechanical shutter 410 is used and is synchronized by processor 404. Shutter 410 opens prior to the capture of the first image and remains open for the duration of the second flash. It then receives a signal to close in order to eliminate further exposure from ambient light. Examples of suitable shutters 410 are those that are commercially available and manufactured by Redlake MASD LLC of Tucson, Ariz. However, other shutters 410 may be employed in other embodiments. Further, the exposure may be controlled by the lights, shutter 410, and/or a combination of the two in some embodiments.

Lens 408 is located in front of shutter 410 and is selected to provide the appropriate photographic characteristics of light transmission, depth of focus, etc. In some embodiments, lens 408 is selected between 50 and 250 mm, with the image taken at an f-stop generally in the range of f16 to f22. This provides a zone focus for the image. It also generally eliminates concerns regarding ambient light. However, it will be appreciated that any number of lenses, focusing, and f-stops may be employed in connection with the present invention.

To initiate the capture of the images, an image capture button on remote control 308 (shown in FIG. 3) is preferably used. In some embodiments the remote control 308 is connected to the controller 108, which generates a shutter release signal that is communicated to a shutter controller 412 of camera 106. However, other embodiments use other methods and devices to initiate the image capture. For example, a button, switch or other device might be included on the controller 108 or connected to camera 106. Still further, computing device 110 is used in some embodiments to initiate the process.

A zoom controller 414 is also provided in some embodiments to mechanically adjust the lens 408 to cause the digital camera 106 to zoom in and out on a subject. In some embodiments the remote control 308 (shown in FIG. 3) includes zoom in and out buttons. Signals from the remote control 308 are communicated to the controller 108, which communicates the request to zoom controller 414 of digital camera 106. The zoom controller 414 typically includes a motor that adjusts lens 408 accordingly.

In some embodiments digital camera 106 includes a video camera interface 416 and a data interface 418. Video camera interface 416 communicates live video data from digital camera 106 to controller 108 (or computing device 110) in some embodiments. Data interface 418 is a data communication interface that sends and receives digital data to communicate with another device, such as controller 108 or computing device 110. For example, in some embodiments the data interface receives image capture messages from controller 108 that instruct digital camera 106 to capture one or more digital images. Data interface 418 is also used in some embodiments to transfer captured digital images from memory 406 to another device, such as controller 108 or computing device 110. Examples of video camera interface 416 and data interface 418 are USB interfaces. In some embodiments video camera interface 416 and data interface 418 are the same, while in other embodiments they are separate interfaces.

Figure 5:
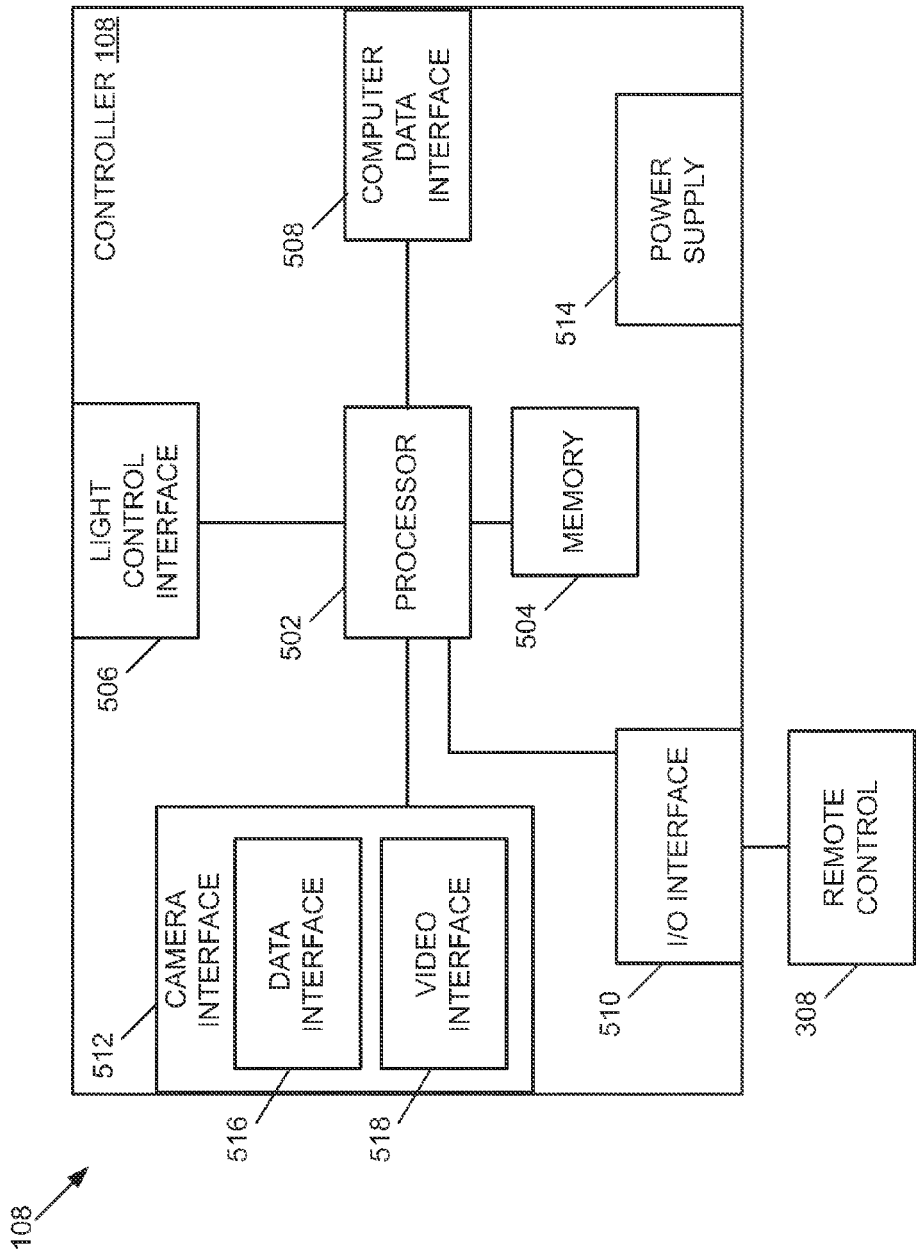
FIG. 5 is a schematic block diagram of an example controller of the photography station shown in FIG. 1.

FIG. 5 is a schematic block diagram of an example controller 108. In this example, controller 108 includes a processor 502, memory 504, light control interface 506, computer data interface 508, input/output interface 510, camera interface 512, and power supply 514. In some embodiments, camera interface 512 includes a data interface 516 and a video interface 518.

Processor 502 performs control operations of controller 108, and interfaces with memory 504. Examples of suitable processors and memory are described herein.

Light control interface 506 allows controller 108 to control the operation of one or more lights, such as the main light 118, fill light 120, hair light 124, and background light 126 (shown in FIG. 1). In some embodiments light control interface 506 is a send only interface that does not receive return communications from the lights. Other embodiments permit bidirectional communication. Light control interface 506 is operable to selectively illuminate one or more lights at a given time. Controller 108 operates to synchronize the illumination of the lights with the operation of camera 106.

Computer data interface 508 allows controller 108 to send and receive digital data with computing device 110. An example of computer data interface 508 is a universal serial bus interface, although other communication interfaces are used in other embodiments, such as a wireless or serial bus interface.

One or more input devices, such as remote control 308, are coupled the processing device 602 through input/output interface 510. The input devices 630 can be connected by any number of input/output interfaces 510 in various embodiments, such as a parallel port, serial port, game port, universal serial bus, or wireless interface.

Camera interface 512 allows controller 108 to communicate with camera 106. In some embodiments, camera interface 512 includes a data interface 516 that communicates with data interface 418 of camera 106 (shown in FIG. 4), and a video interface 518 that communicates with video camera interface 416 of camera 106 (also shown in FIG. 4). Examples of such interfaces include universal serial bus interfaces. Other embodiments include other interfaces.

In some embodiments a power supply 514 is provided to receive power, such as through a power cord, and to distribute the power to other components of the photography station 100, such as through one or more additional power cords. Other embodiments include one or more batteries. Further, in some embodiments controller 108 receives power from another device.

In some embodiments, controller 108 is arranged and configured to provide a single trigger pulse at the start of the integration of the first image. This pulse may be used by the controller 108 to synchronize the lights 118, 120, 124, and 126. In one embodiment, the front or rising edge is used to trigger the background light 126 and/or hair light 124, while the trailing or falling edge can trigger the main light 118 and/or fill light 120. Other types of triggers and pulses may be used. For example, controller 108 uses two different pulses in some embodiments, etc. Yet other embodiments communicate digital messages that are used to synchronize and control the various operations.

Figure 6:
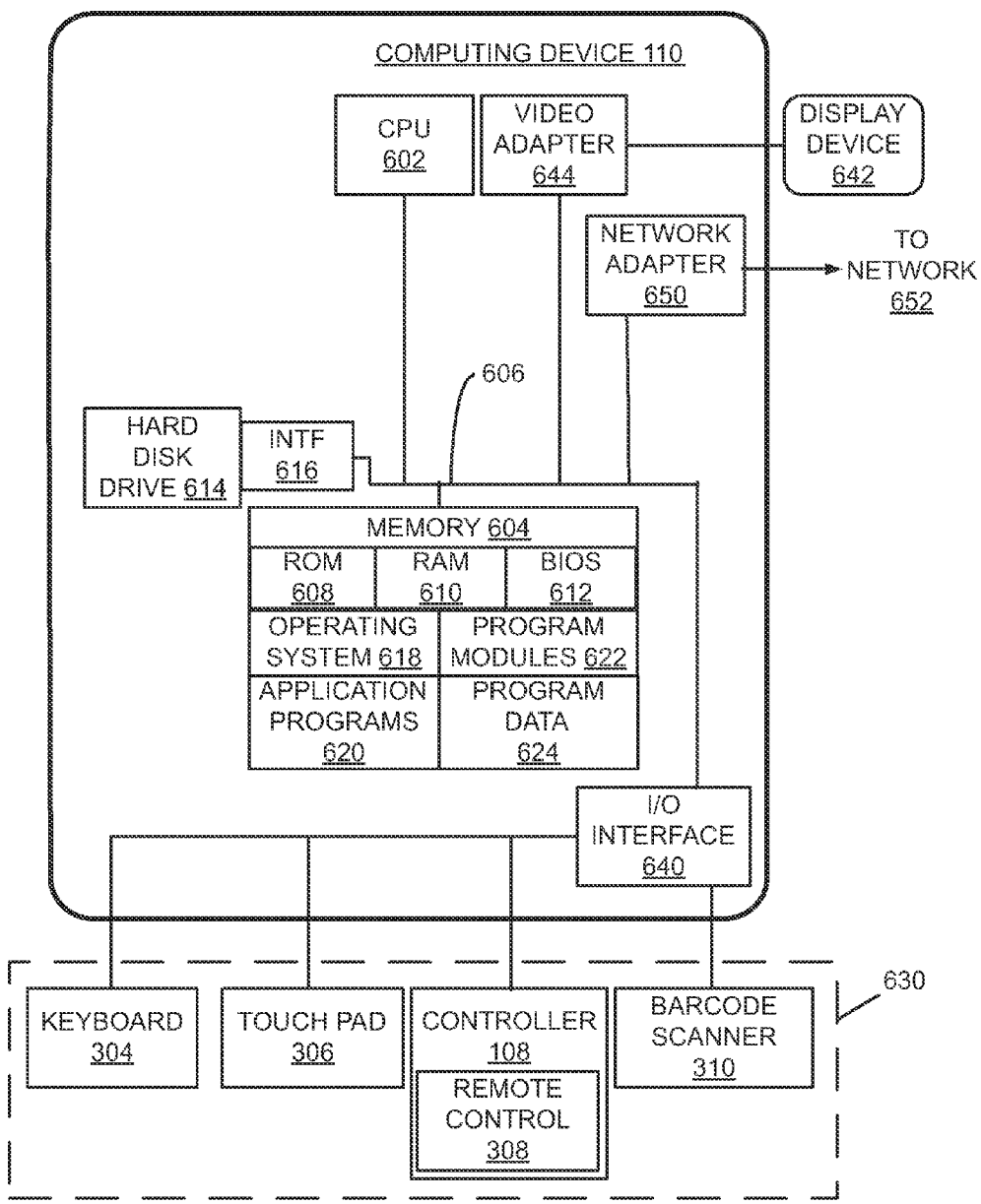
FIG. 6 is a schematic block diagram illustrating an architecture of an example computing device of the photography station shown in FIG. 1.

FIG. 6 is a schematic block diagram illustrating an architecture of an example computing device 110. In this example, computing device 110 is a computer, such as a laptop computer, a desktop computer, or a handheld computer. In some embodiments, computing device 110 operates to execute the operating system, application programs, software modules, and operations described herein. In some embodiments such modules are stored in memory as computer-readable instructions, which when executed by the processor perform one or more of the operations described herein.

Computing device 110 includes, in some embodiments, at least one processing device 602. A variety of processing devices are available from a variety of manufacturers, for example, Intel or Advanced Micro Devices. In this example, computing device 110 also includes system memory 604, and system bus 606 that couples various system components including system memory 604 to processing device 602. System bus 606 is one of any number of types of bus structures including a memory bus, or memory controller; a peripheral bus; and a local bus using any of a variety of bus architectures.

System memory 604 includes read-only memory 608 and random access memory 610. Basic input/output system 612, containing the basic routines that act to transfer information within computing device 110, such as during start up, is typically stored in read-only memory 608.

Computing device 110 also includes secondary storage device 614 in some embodiments, such as a hard disk drive, for storing digital data. Secondary storage device 614 is connected to system bus 606 by secondary storage interface 616. Secondary storage devices 614 and their associated computer readable media provide nonvolatile storage of computer readable instructions (including application programs and program modules), data structures, and other data for computing device 110.

Although the exemplary architecture described herein employs a hard disk drive as a secondary storage device, other types of computer readable storage media are included in other embodiments. Examples of these other types of computer readable storage media include magnetic cassettes, flash memory cards, digital video disks, Bernoulli cartridges, compact disc read only memories, digital versatile disk read only memories, random access memories, or read only memories.

A number of program modules can be stored in secondary storage device 614 or system memory 604, including operating system 618, one or more application programs 620, other program modules 622, and program data 624.

In some embodiments, a user provides inputs to the computing device 110 through one or more input devices 630. Examples of input devices 630 include keyboard 304, touch pad 306, remote control 308, and barcode scanner 310. Some embodiments include a mouse, a touch sensitive display, or other input devices.

Graphical user interfaces described herein are often configured to receive inputs from touch pad 306 or a mouse, such as to control a pointer displayed on the screen and to select from the various controls provided by the graphical user interface. Keyboard 304 is often used to receive text-based (i.e., characters including numbers or letters) input from a user.

In some embodiments input/output interface 640 is used to communicate with controller 108, shown in FIG. 4. For example, in some embodiments a remote control 308 is coupled to the controller 108, which includes one or more selectable buttons for providing an input. Examples of buttons on remote control 308 include up and down buttons to adjust the height of camera 106 (i.e., using motor 302), zoom in and out buttons to adjust the zoom of a lens of camera 106, an image capture button to initiate the capturing of an image, and a hair light control button to toggle the hair light on and off. Other embodiments include more or fewer buttons or controls on remote control 308. Remote control is alternatively connected to computing device 110 rather than controller 108.

Barcode scanner 310 is provided in some embodiments to read barcode data, such as printed on a card. For example, in some embodiments a subject is identified through a barcode. In some embodiments an order is identified through a barcode. Example embodiments utilizing barcodes and barcode scanner 310 are described in more detail herein.

Input devices 630 are often connected to the processing device 602 through input/output interface 640 that is coupled to system bus 606. These input devices 630 can be connected by any number of input/output interfaces, such as a parallel port, serial port, game port, or a universal serial bus. Wireless communication between input devices and interface 640 is possible as well, and includes infrared, BLUETOOTH® wireless technology, 802.11a/b/g/n wireless communication, cellular communication, or other radio frequency communication systems in some possible embodiments.

In this example embodiment, a display device 642, such as a monitor, liquid crystal display device, projector, or touch screen display device, is also connected to system bus 606 via an interface, such as video adapter 644. In addition to display device 642, the computing device 110 can include various other peripheral devices (not shown), such as speakers or a printer.

When used in a local area networking environment or a wide area networking environment (such as the Internet), computing device 110 is typically connected to network 652 through a network interface or adapter 650. Other possible embodiments use other communication devices. For example, some embodiments of computing device 110 include a modem for communicating across network 652.

Computing device 110 typically includes at least some form of computer-readable media. Computer readable media include any available media that can be accessed by computing device 110. By way of example, computer-readable media include computer readable storage media and communication media.

Computer readable storage media includes volatile and nonvolatile, removable and non-removable media implemented in any device configured to store information, such as computer readable instructions, data structures, operating systems 618, application programs 620, program modules 622, program data 624, or other data. Examples of program modules 622 include setup module 702, photography module 704, and data storage module 706, shown in FIG. 7.

System memory 604 is an example of computer readable storage media. Computer readable storage media includes, but is not limited to, read-only memory 608, random access memory 610, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by computing device 110.

Communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, communication media includes wired media such as a wired network or direct-wired connection, and wireless media such as acoustic, radio frequency, infrared, and other wireless media. Combinations of any of the above are also included within the scope of computer readable media.

Figure 7:
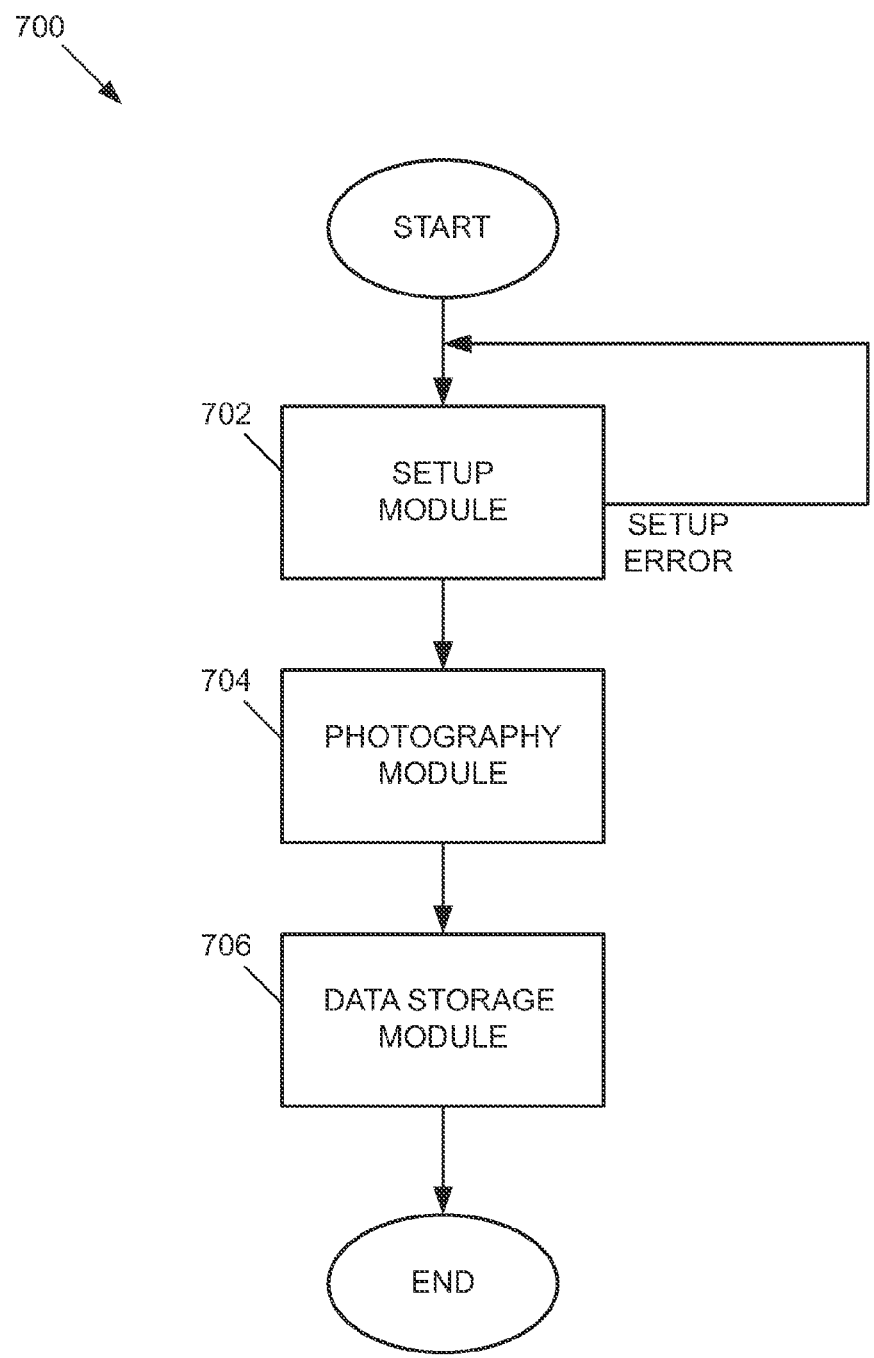
FIG. 7 is a schematic block diagram of an example method of capturing digital images.

FIG. 7 is a schematic block diagram of an example method 700 of capturing digital images. In this example, method 700 includes the execution of a setup module 702, a photography module 704, and data storage module 706.

Method 700 begins by executing a setup module 702 that operates to perform initial setup and calibration operations. An example of the operations performed by setup module 702 is shown in FIG. 8, with additional examples being described herein with reference to FIGS. 9-27.

After setup has been successfully completed, a photography module 704 is executed that operates to capture digital images of one or more subjects. An example of a photography module 704 is illustrated and described in more detail herein with reference to FIGS. 28-32.

In some embodiments, after the photography module 704 is completed, a data storage module 706 is executed to store the digital data of the captured digital images, such as to copy the digital data onto a computer-readable storage medium or to transfer the digital images across a network to a computer-readable storage medium on another computing device.

Figure 8:
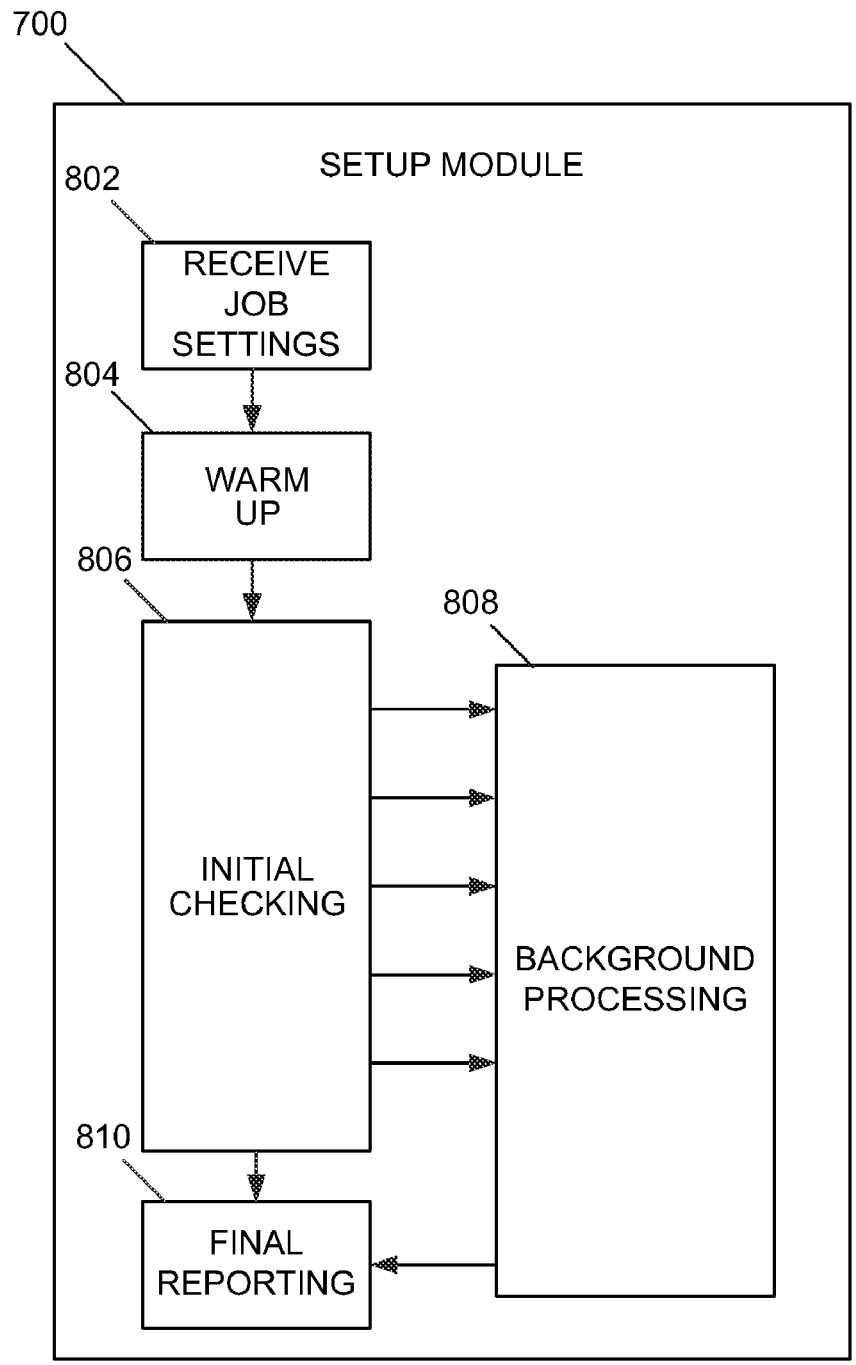
FIG. 8 is a functional block diagram of an example set of operations performed during a setup operation.

FIG. 8 is a functional block diagram of an example set of operations performed during setup, such as performed by setup module 702. FIG. 8 also illustrates an example of a method of setting up a photography station 100. In this example, the operations performed by setup module 702 include operations 802, 804, 806, 808, and 810.

Operation 802 is performed in some embodiments to receive information from the operator regarding the current photography session. For example, in some embodiments operation 802 prompts the user to enter setup information, which is then received from the user. Examples of setup information include a photographer identification code, a payment status for the photography session, an operating mode for the photography session, and a desired pose count. Further examples of operation 802 are illustrated and described herein with reference to FIGS. 9-15.

After receiving the job settings, setup module 702 warms up the lights in operation 804.

After the lights have been warmed up, setup module 702 performs various tests to check the configuration of photography station 100 and generate calibration data. In some embodiments the process is separated into an operation 806 that captures sample images and performs quick initial testing of the sample images, and a separate operation 808 that performs more detailed digital image processing in the background in parallel with operation 806.

Operation 806 involves the capturing of particular setup images and the initial checking of those setup images to confirm that they are suitable for further processing. Typically such initial checking is performed quickly so that the setup module can provide prompt feedback to the user, such as if the setup image must be recaptured, or promptly move on to the next test or operation in the setup process. In this way, the user can be provided with prompt, nearly instantaneous feedback rather than being forced to wait for image processing to be completed. In some embodiments initial checking operations 806 are performed consecutively one-after-another. In some embodiments the initial checking operations described herein are foreground operations.

Operation 808 involves further image processing that is performed in the background while the initial checking operation 806 is performing subsequent tests or operations. For example, after operation 806 has captured a first setup image and has performed an initial check to confirm that the setup image is suitable for further processing, the image is passed to operation 808 where further image processing is performed on the setup image. An example of a background processing operation is an operation that is performed without interaction with the user while initial processing operations 806 are being performed with user interaction. In some embodiments background processing operations are assigned a lower priority in the microprocessor's allotment of time than initial processing operations 806 and generally remain invisible to the user unless an error is detected.

In some embodiments digital images captured by camera 106 have a high resolution, and accordingly have a large amount of data. For example, in some embodiments digital images have a file size in a range from about 10 megabytes to about 25 megabytes, and in other embodiments in a range from about 18 megabytes to about 23 megabytes. Other embodiments have other file sizes.

The time required to process such images can be significant, due to the large amount of data that must be processed. For example, in some embodiments the processing time for a single digital image is in a range from about 5 seconds to about 30 seconds, and in another embodiment in a range from about 10 seconds to about 20 seconds. If the setup module 702 were programmed to finish all data processing of a sample image for a single test or operation before moving on to the next test or operation, the user would be required to wait for such processing to be completed. Users generally do not want to wait 5 to 30 seconds for a computer to perform such processing. Therefore, in some embodiments separate operations are provided to perform initial checking operation 806 and background processing operation 808 that can be operating in parallel after the first setup image of initial checking operation 806 has been captured and confirmed to be sufficient for background processing 808.

In some embodiments, some operations performed by initial checking operation 806 require user input or interaction. While the user is providing the input or performing the necessary interaction, the background processing 808 continues to be performed without the user knowing that any processing is occurring.

In some embodiments, once the initial checking operation 806 and the background processing operation 808 have been completed, final reporting operation 810 is performed. During final reporting, the setup module 702 identifies to the user whether any errors or potential problems were detected during background processing operation 808. In some embodiments if an error was detected, one or more operations of setup module 702 are repeated until the error is no longer detected.

FIGS. 9-16 illustrate an example of operation 802, shown in FIG. 8, in which job settings are received from the user. In some embodiments the job settings are received by a setup module 702, shown in FIG. 7.

Figure 9:
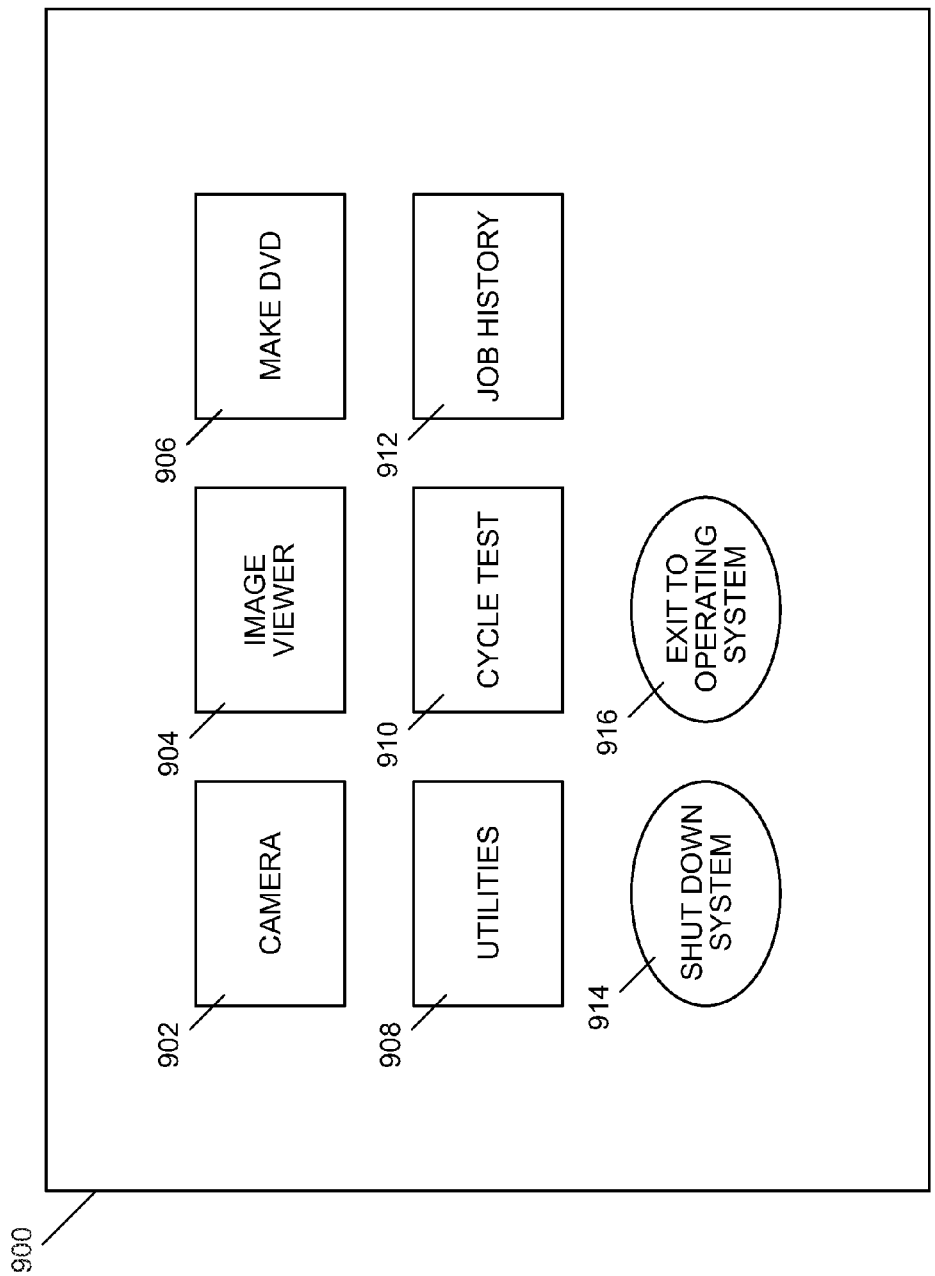
FIG. 9 is a screen shot of an example user interface of an example photography station software application.

FIG. 9 is a screen shot of an example user interface 900, such as generated by a photography station software application operating on computing system 110. The user interface 900 includes a plurality of selectable controls 902, 904, 906, 908, 910, 912, 914, and 916.

Control 902 is a camera button that, when selected, initiates a setup module 702, to prepare the system to capture digital images. FIGS. 10-15 show subsequent user interfaces that are displayed after control 902 is selected in some embodiments.

Control 904 is an image viewer button that initiates an image viewing module that displays to the user digital images that have already been captured by the photography station 100 during the current job.

Control 906 is a storage button that initiates data storage module 706, shown in FIG. 7. Data storage module 706 operates to store digital images onto a computer-readable medium after they have been captured. An example of storage module 706 is illustrated and described in more detail herein with reference to FIGS. 33-34.

Control 908 is a utilities button that initiates a utilities module. An example of a utility that are provided by the utilities module includes a threshold adjustment module. The threshold adjustment module can be used by the photographer (or other user) to adjust testing threshold values. For example, if an error is being detected by the photography station 100 but the user wants to override the error or adjust the photography station so that the error will no longer be detected, one or more relevant threshold values can be adjusted by the user so that the error is no longer detected. As a more specific example, if the background light has slightly degraded such that it is not as bright as expected by system 100, the brightness threshold value can be reduced by the user so that the current brightness is greater than the adjusted threshold value. Other embodiments include more or fewer utilities.

Control 910 is a cycle test button that initiates a cycle test module. For example, after a user has selected the control 910 associated with the cycle test button, an abbreviated set of one or more of the tests described herein (or other tests) are performed automatically to confirm that one or more aspects of system 100 are operational.

Control 912 is a job history button that initiates a job history module. The job history module provides a similar functionality as the image viewer 904 and data storage module 906, except that the job history module displays all images associated with all jobs that are currently stored by station 100. Therefore, using the job history module the user can select a job of interest, review the digital images associated with the job, and store the digital images on a computer-readable medium, if desired.

After a photography session has been completed, a shut down system button is provided by control 914. When the control 914 is selected, the software application initiates a shut down sequence to shut down the photography station 100 including the software application.

If the user wants to exit the software application without shutting down the entire photography station, control 916 is provided, which is an exit to windows button. Upon selection of control 916, the software application is terminated and the computing device returns control to the operating system, such as to a Windows® operating system or other operating system.

Figure 10:
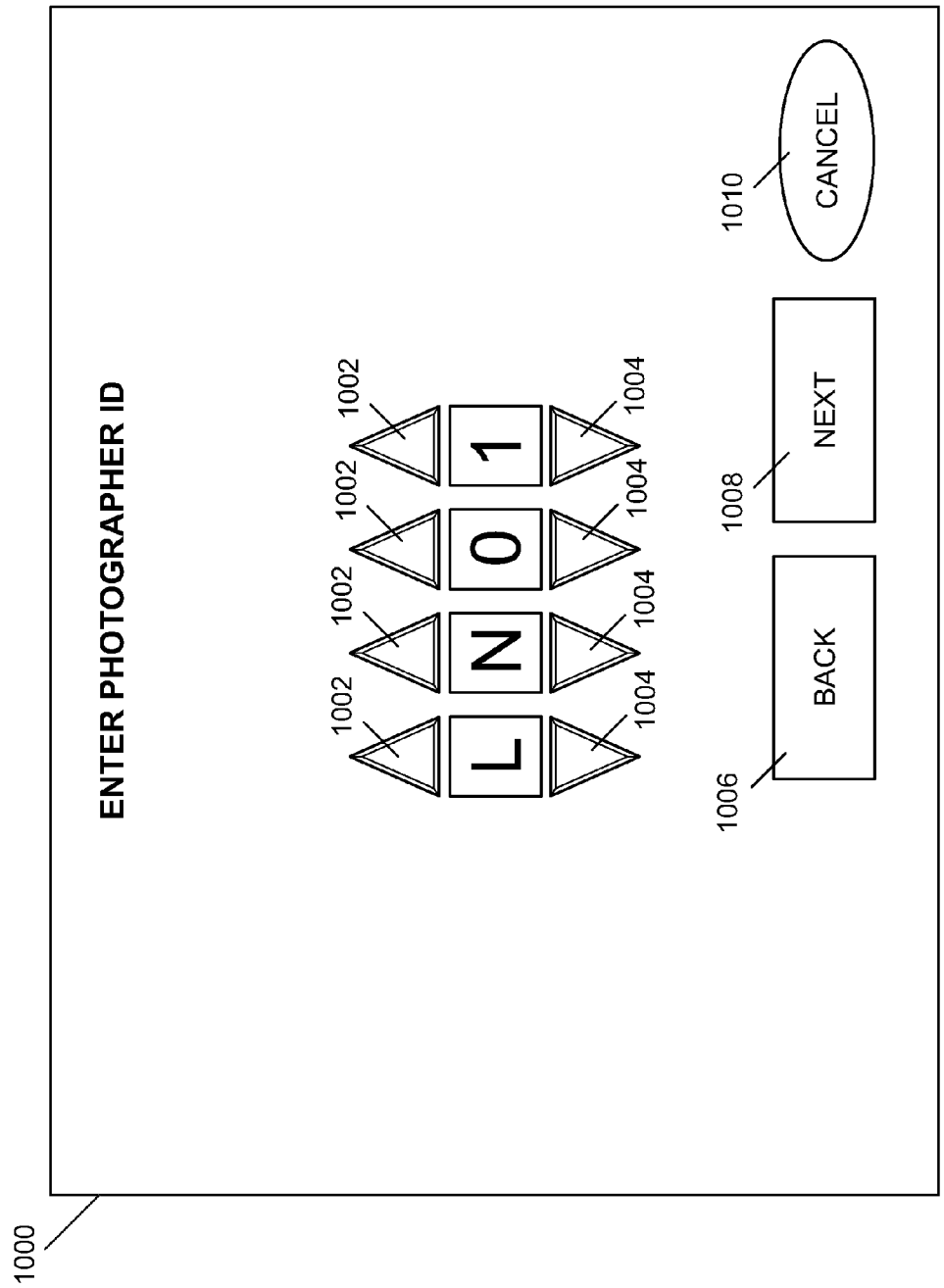
FIG. 10 is a screen shot of an example user interface of a setup module.

FIG. 10 is a screen shot illustrating an example user interface 1000 of a setup module 702 that is displayed, for example, after selection of control 902 shown in FIG. 9. The user interface 1000 is used in some embodiments to receive job settings, such as operation 802, shown in FIG. 8.

In this example, user interface 1000 prompts the user to enter an identification code, such as a photographer identification code. The user enters the code using selectable controls 1002 and 1004 to toggle the characters up and down, and then selects the next button 1008 to advance to the next user interface to receive additional job settings. The back button 1206 returns the user to a previous user interface. A cancel button 1210 is provided to return to user interface 900, shown in FIG. 9.

Additional job information is received in some embodiments. Some examples of additional job information include a job number for the current photography session, a location code, a date, a school ID number, a marketing code, payment status (i.e., payment required, pre-paid, bill, etc.), photograph type identifier, and a number of poses expected for each subject. Other embodiments collect other types of job information.

In some embodiments, after the job information has been received, setup module 702 displays the job settings to the user and prompts the user to confirm that the job settings are correct. After all job settings have been confirmed to be correct, the setup module ends operation 802, shown in FIG. 8.

Figure 11:
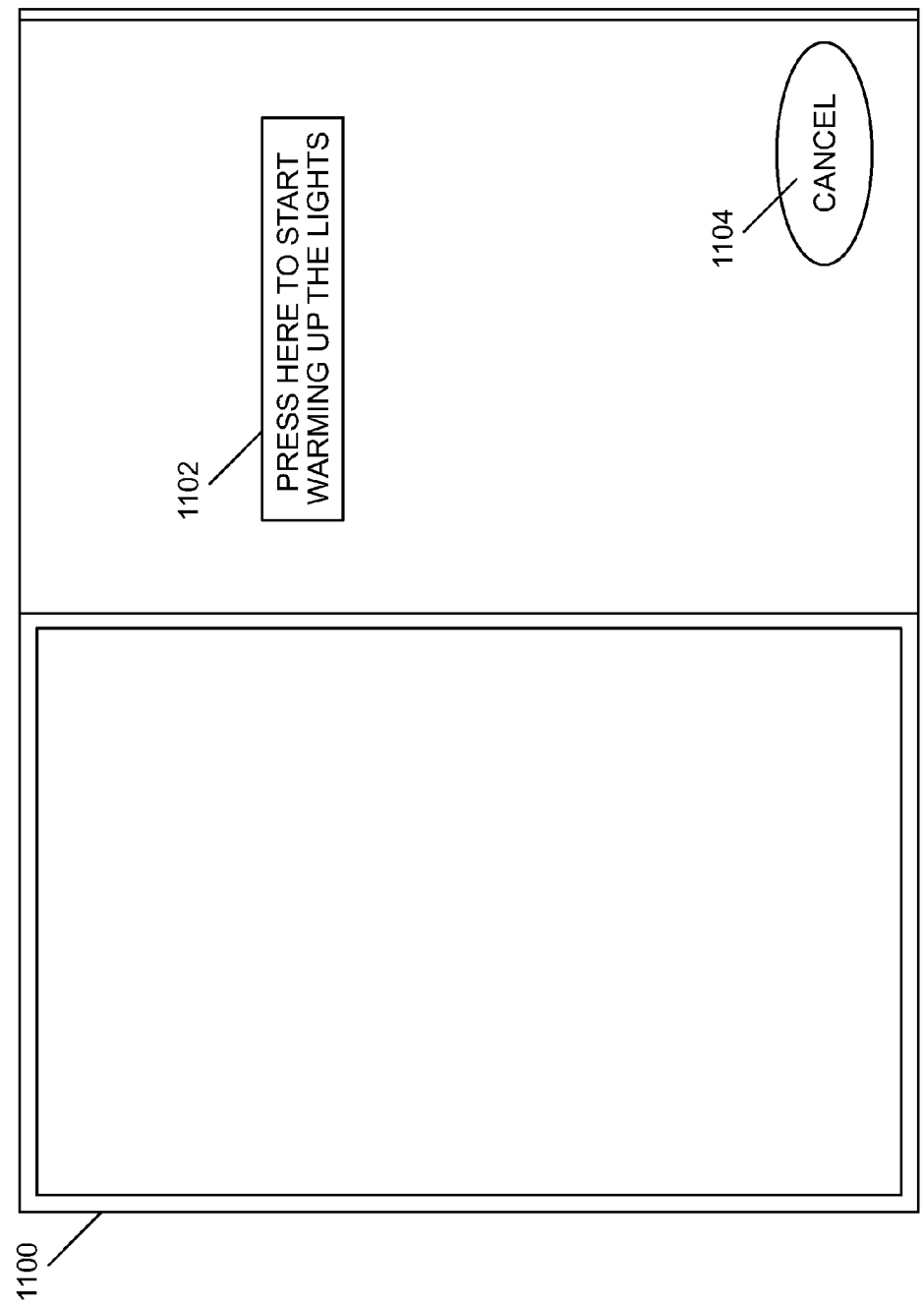
FIG. 11 is a screen shot of another example user interface of the setup module.
Figure 12:
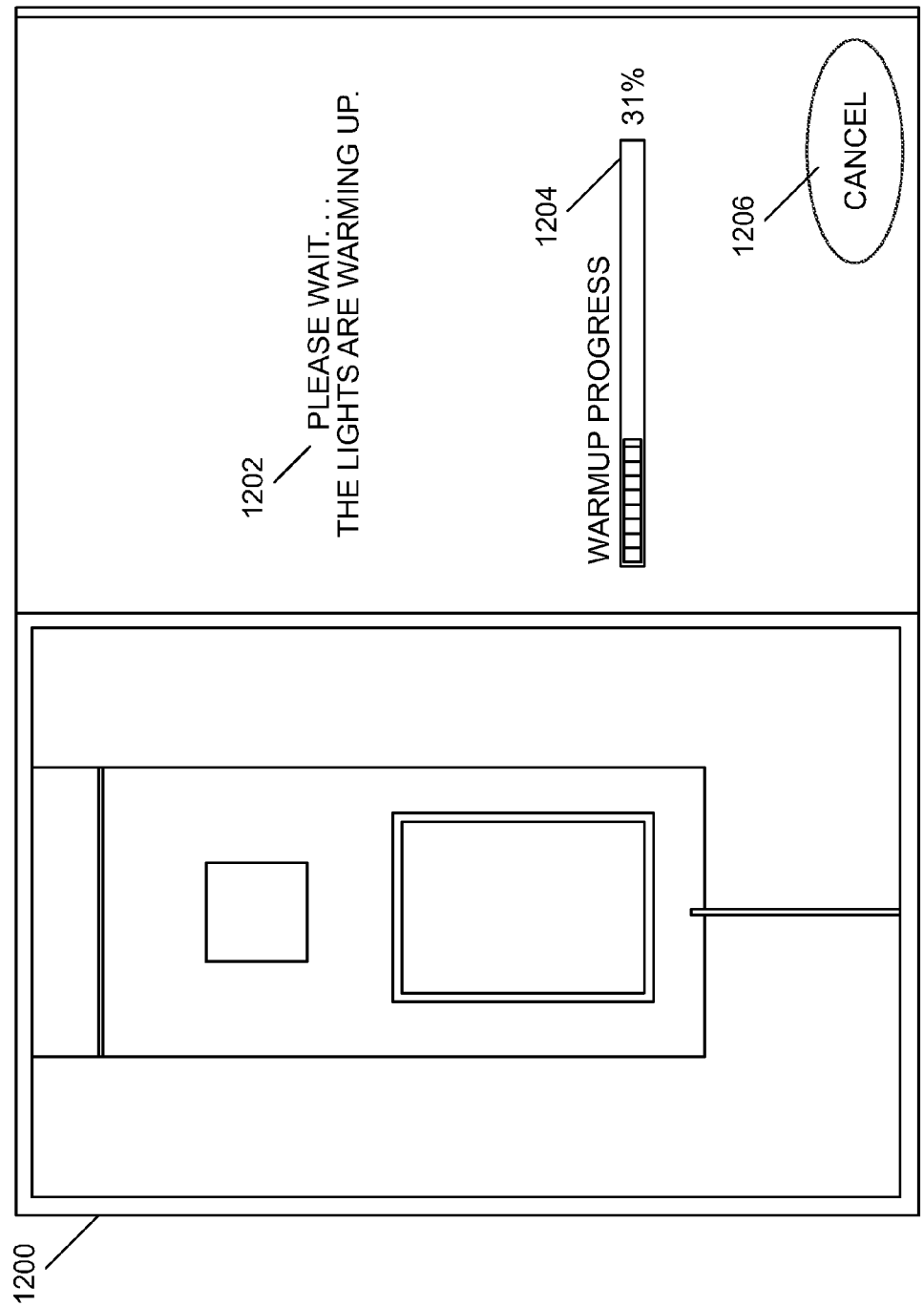
FIG. 12 is a screen shot of another example user interface of the setup module.

FIGS. 11-12 illustrate example user interface displays 1100 and 1200 that are generated during operation 804, shown in FIG. 8. FIG. 11 illustrates an example user interface 1100 that prompts the user to press a button 1102 to start warming up the lights of the photography station 100, shown in FIG. 1. Upon selection of button 1102, the photography station 100 initiates a warm up operation and displays user interface 1200, shown in FIG. 12. A button 1104 is provided to cancel the warm up operation and return to user interface 900, shown in FIG. 9.

FIG. 12 is a screen shot of an example user interface 1200 that is displayed during a warm up operation of operation 804. In this example, user interface 1200 includes an instruction prompt 1202, a warm up progress bar 1204, and a cancel button 1206. Instruction prompt 1202 instructs the user to wait while the lights are warming up. Warm up progress bar 1204 provides a status indicator that shows the user that the warm up operation is active and the current status of the warm up process. For example, in some embodiments the progress bar 1204 shows what percentage of the warm up process has been completed (i.e., 31%). During the warm up operation the lights are activated periodically to cause them to flash. The process is repeated a number of times until the lights have been warmed up to an operational condition. The warm up process ensures that the lights are operating to generate light similar to what will be generated during the photography session. A cancel button 1206 is provided to allow the user to terminate the warm up operation and return to user interface 900, shown in FIG. 9. Otherwise, after the warm up operation has been completed, the setup module continues with operations 806 and 808 in some embodiments.

Figure 13:
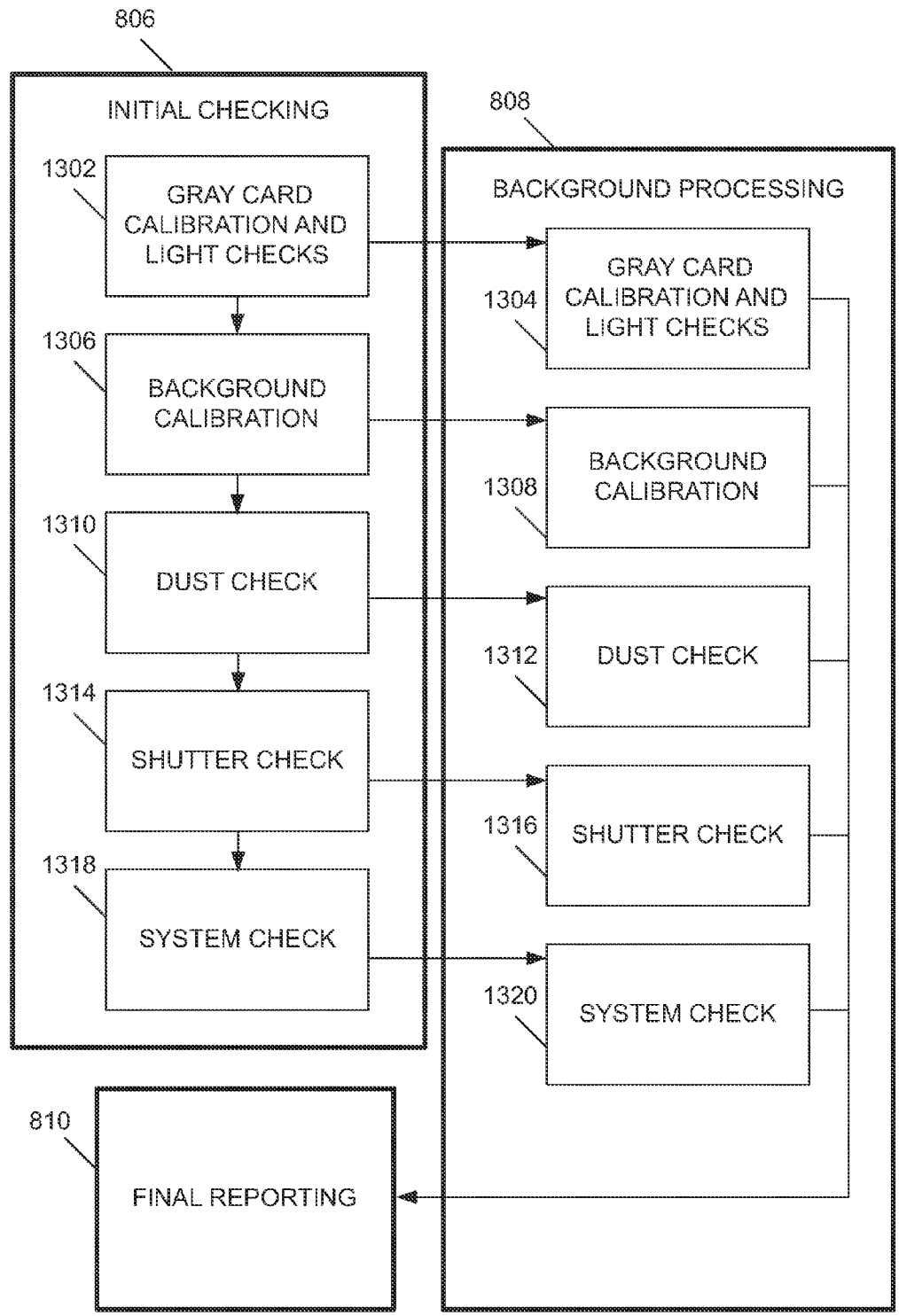
FIG. 13 is a flow chart of an example initial checking operation and of an example background processing operation.

FIG. 13 is a flow chart illustrating a more detailed example the initial checking operation 806 and the background processing operation 808 of the setup module 702, shown in FIG. 8. In this example, initial checking operation 806 includes operations 1302, 1306, 1310, 1314, and 1318 and background processing operation 808 includes operations 1304, 1308, 1312, 1316, and 1320. After initial checking operation 806 and background processing operation 808 are completed, final reporting operation 810 is performed. Examples of the operations shown in FIG. 13 are illustrated and described herein with reference to FIGS. 14-27.

Figure 14:
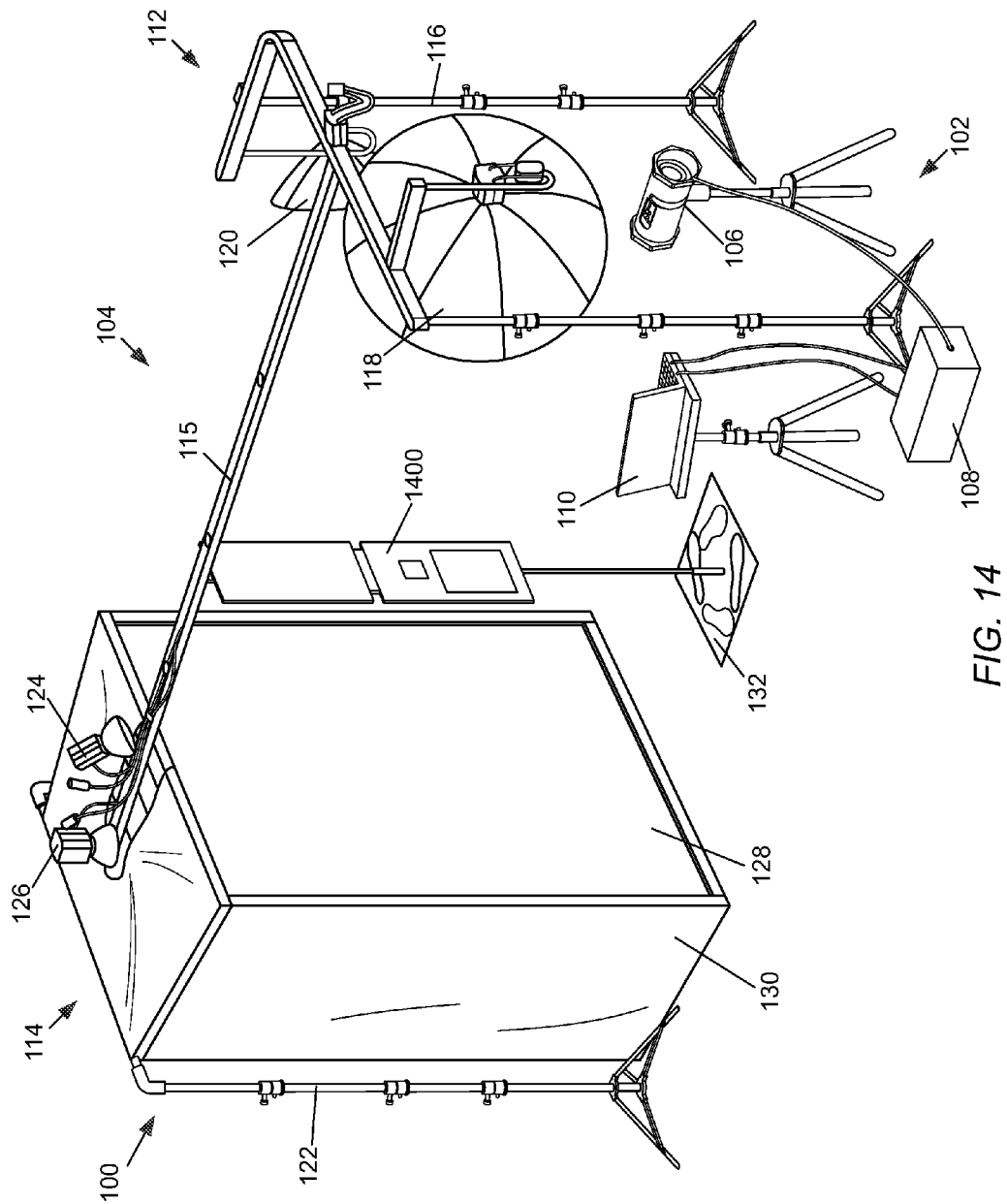
FIG. 14 is a schematic perspective diagram of the photography station shown in FIG. 1, and further including a gray card assembly.
Figure 15:
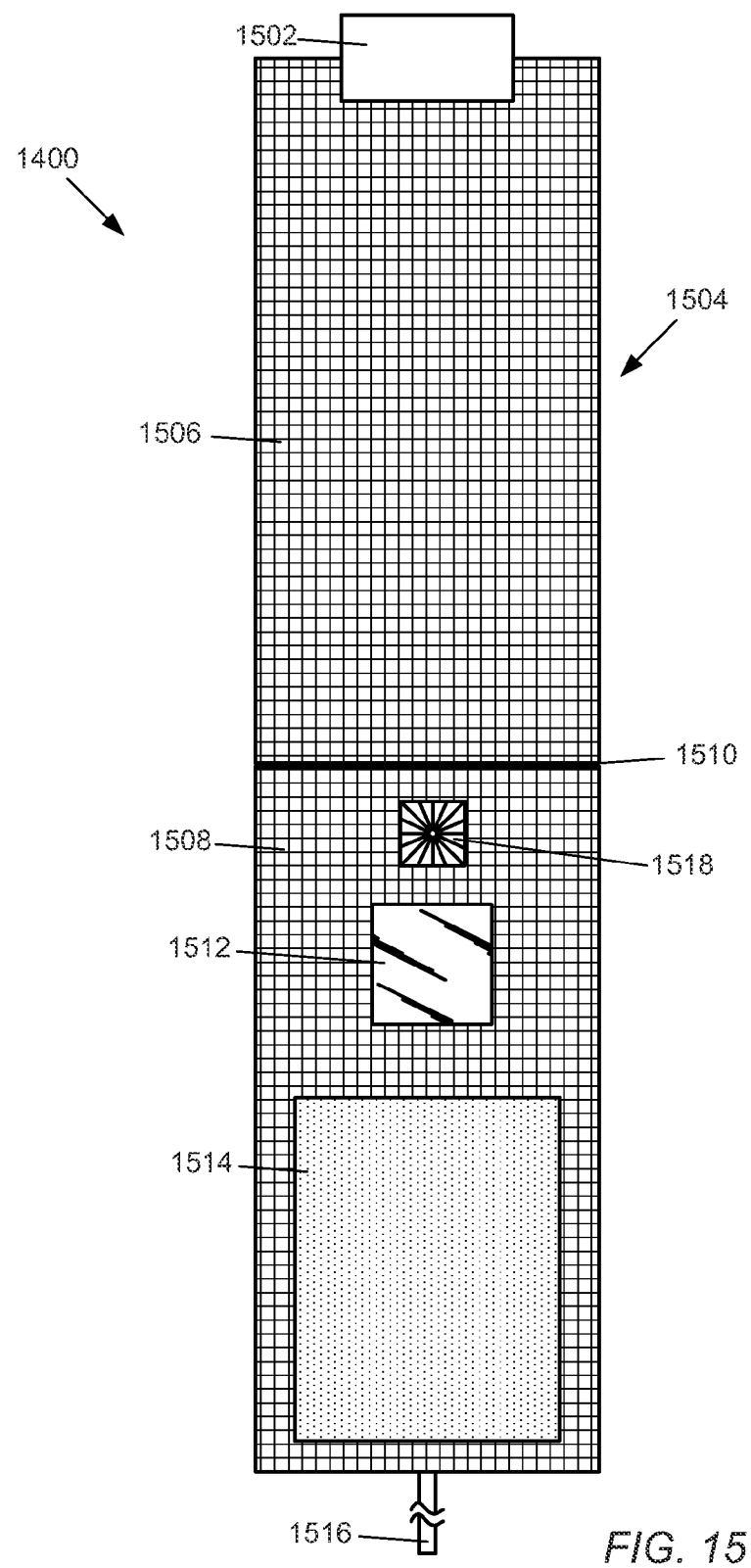
FIG. 15 is a schematic front view of the gray card assembly shown in FIG. 14.

In this example, operations 1302 and 1304 are first performed to collectively perform a gray card calibration and light check operation. In one embodiment, a user is first prompted to arrange a gray card in front of the background. An example of a gray card is shown in FIGS. 14-15. Digital images of the gray card and the background are then captured. Operation 1302 is performed to perform an initial check on the digital images, such as to confirm that a gray card is found in the digital images. If operation 1302 determines that the gray card is present, operation 1304 is performed to further process the digital images, such as to generate one or more calibration values and to confirm that the lights are functioning properly. Examples of operations 1302 and 1304 are illustrated and described herein with reference to FIGS. 17-23.

In some embodiments, gray card calibration operation 1302 or 1304 (or another setup operation) is used to confirm that a lens cap has been removed from the digital camera. Any operation that confirms that an image (other than a completely dark image) has been captured by the digital camera will also serve the additional function of confirming that the lens cap has been removed because light captured in the digital image would be blocked by the lens cap if not removed prior to the image capture. However, some embodiments of camera 106 do not include a lens cap or cover, so such confirmation is not necessary in all embodiments.

After the initial checking operation 1302 has been completed successfully, operations 1306 and 1308 are performed to collectively perform a background calibration operation. The background calibration operation instructs the user to zoom the camera out until the top and bottom edges of the background are within the view of the camera. An image is then captured and initially checked by operation 1306, which confirms that the camera was properly zoomed and identifies the top and bottom edges of the background. If the initial check of operation 1306 is successful, operation 1308 is then performed to further process the digital image. In some embodiments operation 1308 evaluates the background to confirm that the correct background is properly installed and that there are no major marks or other blemishes in the background, and that there are no objects obstructing the camera's view of the background. Examples of operations 1306 and 1308 are illustrated and described in more detail herein with reference to FIG. 24.

After the initial checking operation 1306 has been completed successfully, operations 1310 and 1312 are performed to collectively perform a dust check operation. The dust check operation instructs the user to zoom in on the background so that the camera becomes unfocused. An image is then captured and initially checked by operation 1310, such as to confirm that the camera has been zoomed in. If the initial check operation 1310 completes successfully, operation 1312 is then performed to further process the digital image. In some embodiments operation 1312 evaluates the image to check for dust or other blemishes in the camera, such as on the electronic image sensor 402, such as a CCD array (shown in FIG. 4). If such blemishes are present, a sharp dark region will be present in the digital image that is detected by operation 1312. Examples of operations 1310 and 1312 are illustrated and described in more detail herein with reference to FIG. 25.

After the initial checking operation 1310 has been completed successfully, operations 1314 and 1316 are performed to collectively perform a shutter check operation. The shutter check operation captures an image without opening the shutter. The resulting image is referred to as a dark frame image. The dark frame image is then initially processed by operation 1314, which performs a quick check of the image to confirm that the image is generally dark. If the initial check operation completes successfully, operation 1316 is performed to further process the digital image. In some embodiments, operation 1316 evaluates the image to check for light areas or color gradients. Examples of operations 1314 and 1316 are illustrated and described in more detail herein with reference to FIG. 25.

After the initial checking operation 1314 has been completed successfully, operations 1318 and 1320 are performed to collectively perform a final system check operation. In this example, the system check operation prompts the user to stand at the posing position (i.e. on posing position mat 132, shown in FIG. 1), and to press the image capture button on the remote control (i.e., remote control 308, shown in FIG. 3). When the image capture button is pressed, a first image is captured using the foreground lighting and then, a moment later, a second image is captured using only the background lighting. The images are then initially processed by operation 1318, which performs a quick check to confirm that both images were captured and that one is front lit and one is back lit. If the initial check operation 1318 completes successfully, the images are then processed by operation 1320. In operation 1320, the back lit image is processed to identify the location of the background in the back lit image and then to remove the background from the front lit image. The resulting image with background replacement is displayed to the user, who reviews the image and confirms that the background was properly replaced and that the subject is completely visible. Examples of operations 1318 and 1320 are illustrated and described herein with reference to FIGS. 26-27.

If any of the setup operations are not completed successfully, a final reporting operation 810 is performed to communicate such information to the user. One or more of the operations are then repeated in some embodiments until all operations have been completed successfully. Although operation 810 is shown as described as a final reporting operation, other embodiments perform the reporting operation as soon as the an operation is determined to have been unsuccessful. If no errors are detected, the method of setting up the photography station 100 is completed and the photography station transitions to a photography mode, such as using a photography module 704, shown in FIG. 7. The photography mode is illustrated and described in more detail herein with reference to FIGS. 28-32.

An exemplary set of operations is illustrated and described with reference to FIG. 13 and in the following examples. However, other embodiments include more, fewer, or other operations than those shown, and such operations can be performed in a different order if desired.

FIG. 14 is a schematic perspective diagram illustrating the example photography station 100, shown in FIG. 1, and further including a gray card assembly 1400, such as used in the gray card calibration operations 1302 and 1304.

To begin the gray card calibration operations 1302 and 1304, the user is instructed to arrange a gray card assembly 1400 as shown in FIG. 14. In this example, the gray card assembly 1400 is hung from alignment member 115 and positioned directly over the posing position (i.e., above posing position mat 132). When in this position, gray card 1400 is arranged between background 128 and camera 106.

Figure 16:
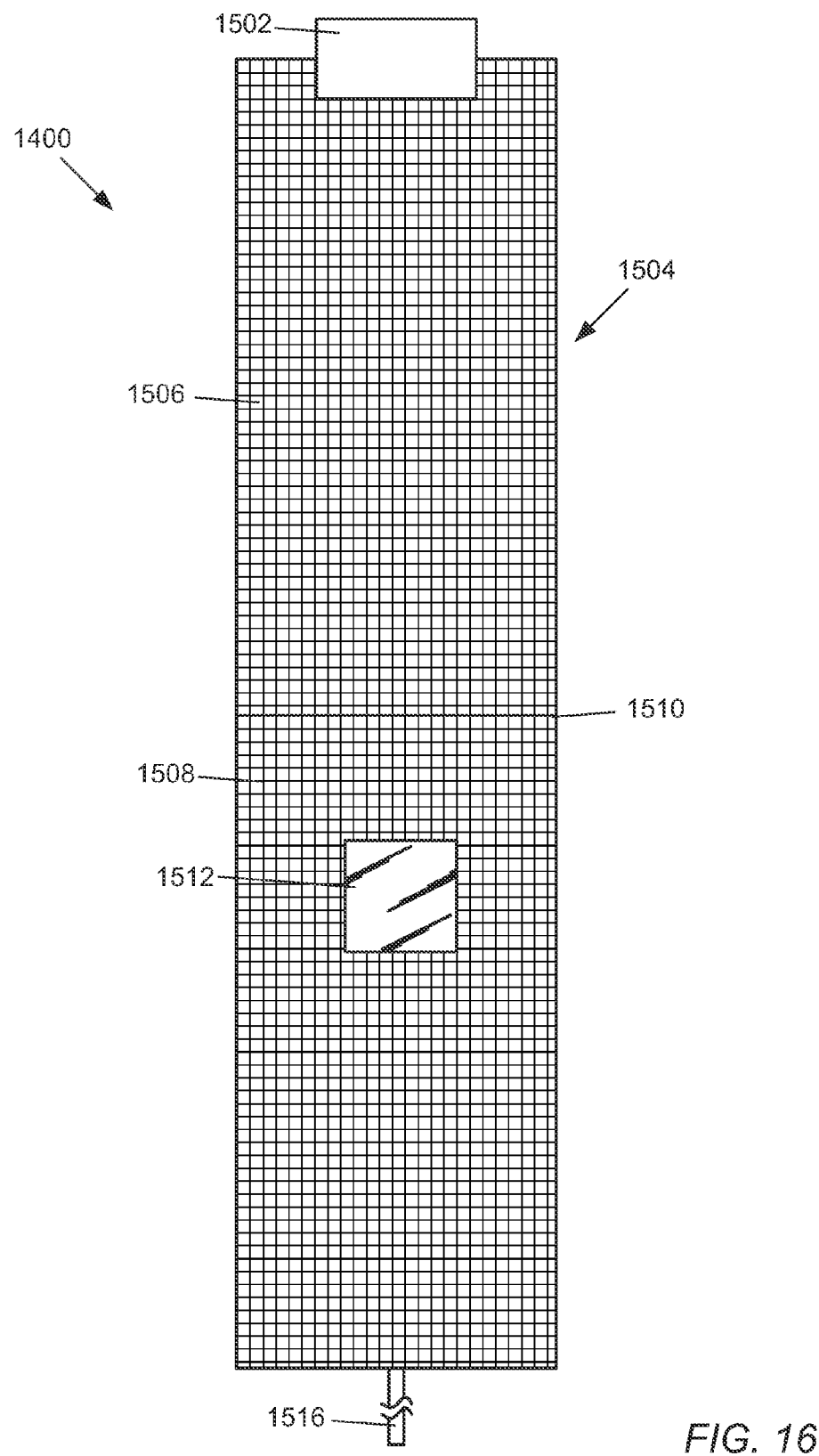
FIG. 16 is a schematic rear view of the gray card assembly shown in FIG. 14.

FIGS. 15-16 illustrate an example gray card assembly 1400. FIG. 15 is a schematic front view of the example gray card assembly 1400, and FIG. 16 is a schematic rear view of the example gray card assembly 1400. In this example, gray card 1400 includes hanger 1502, body 1504, window 1512, gray card 1514, position cord 1516, and spatial frequency target 1518.

Hanger 1502 operates to connect gray card 1400 to an attachment point of alignment member 115. In some embodiments hanger 1502 attaches to sides of alignment member 115 so that gray card assembly 1400, which arranges gray card assembly 1400 so that it faces directly toward camera 106. In some embodiments the hanger 1502 does not permit substantial yaw rotation. Hanger 1502 typically permits gray card 1400 to be held vertically by the force of gravity. In some embodiments, hanger 1502 permits pitch and roll rotation for proper vertical alignment. Hanger 1502 is connected to body 1504, such as at a top edge of body 1504.

In some embodiments, hanger 1502 positions gray card assembly 1400, relative to camera 106 and the foreground lights 118 and 120 so that camera 106 does not receive specular reflection from the lights off of gray card assembly 1400.

In some embodiments body 1504 includes an upper portion 1506 and a lower portion 1508. The upper and lower portions 1506 and 1508 are connected at a fold joint 1510. In this example, upper and lower portions 1506 and 1508 are generally rectangular members composed of one or more sheets. Body 1504 typically has a color that substantially contrasts with the background (i.e., background 132, shown in FIG. 1) and with gray card 1514, such as black. The contrasting color allows gray card assembly 1400 to be easily detected in a digital image. In some embodiments, body 1504 is made of plastic. Other embodiments include other materials, including paper, paperboard, cardboard, vinyl, leather, or other suitable materials.

Body 1504 includes fold joint 1510 in some embodiments. Fold joint 1510 allows the upper portion 1506 to fold, such as to move body 1504 between a closed storage configuration and an open in-use configuration shown in FIGS. 15-16. When in the closed storage position, the face (the major surface shown in FIG. 15) of upper portion 1506 contacts the face (the major surface shown in FIG. 15) of lower portion 1508. The closed storage position protects and encloses gray card 1514. Some embodiments include a first sheet that forms the major surfaces shown in FIG. 15 and a second sheet that forms the major surfaces shown in FIG. 16.

In some embodiments, lower portion 1508 of body 1504 includes window 1512. Window 1512 is typically a translucent or semi-clear material, such as a thin sheet of plastic, a sheet of paper, or a sheet of fabric. FIGS. 15 and 16 show that window 1512 is formed in both front and back surfaces of body 1504. As discussed below, window 1512 allows for the determination of whether or not hair light 124 is operating by inspection of a digital image. In one example embodiment, window 1512 is about 4 inches wide by about 4 inches tall.

In some embodiments, lower portion 1508 of body 1504 includes spatial frequency target 1518. The spatial frequency target is, in some embodiments, about 2 inches wide and about 2 inches tall. The spatial frequency target 1518 is arranged in a specific, known, position of lower portion 1508 so that it can be located in the captured image but does not interfere with the other functions of gray card assembly 1400. As described in more detail herein, the spatial frequency target 1518 is located within the digital image and processed using a frequency analysis.

Lower portion 1508 of body 1504 also includes gray card 1514. The gray card 1514 is positioned within lower portion 1508 so that lower portion 1508 forms a border around gray card 1514. A rectangular window within lower portion 1508 is provided for gray card 1514. The transition between the border and the gray card 1514 is detectable within a digital image. Gray card 1514 typically has a monochromatic color, such as a neutral gray color, preferably with a flat non-glossy surface. As discussed below, because the color of gray card 1514 is known, a digital image of the gray card 1514 can be inspected to unique characteristics of the site where the photography station is located, such as unique lighting or color balances. Such information can be used in subsequent image processing to correct for such unique characteristics of the site, such as to generate more uniform images even if such images are captured with different photography stations. In one example embodiment, gray card 1514 is about 8 inches wide by about 12 inches tall. Other embodiments include other dimensions.

Gray card assembly 1400 further includes a position cord 1516 in some embodiments. Position cord 1516 is typically connected to a bottom end of lower portion 1508 and is configured to hang downward from the bottom end. Position cord 1516 assists the user in correctly positioning posing position mat 132. In this embodiment, after gray card assembly 1400 has been hung, the user arranges posing position mat 132 directly below position cord 1516.

Figure 17:
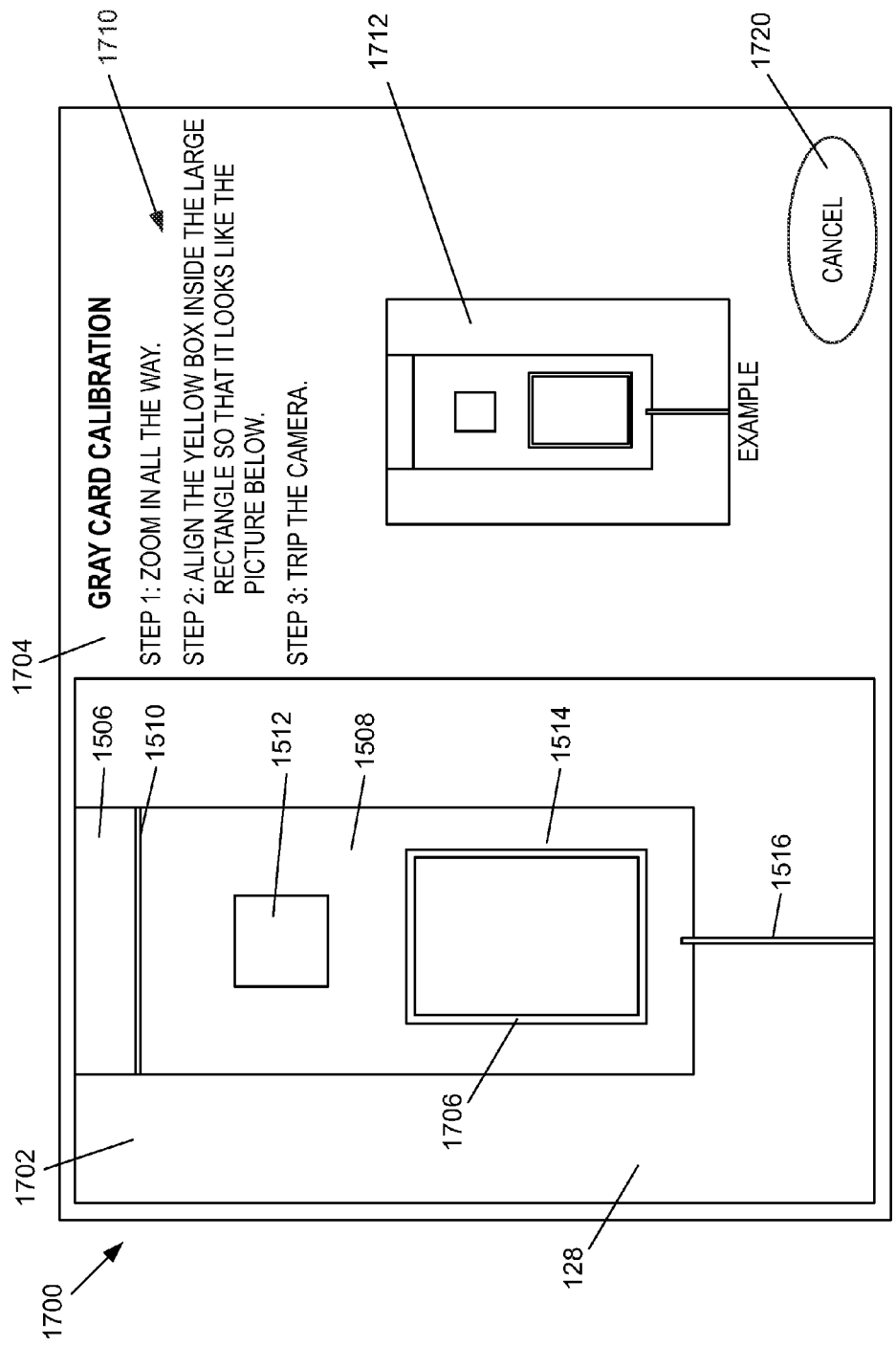
FIG. 17 is a screen shot of another screen shot of the setup module.

FIG. 17 is a screen shot of an example user interface 1700 that is used to begin a gray card calibration operation, such as including operations 1302 and 1304, shown in FIG. 13.

User interface 1700 includes preview window 1702 and instruction window 1704. In some embodiments preview window 1702 displays a video feed from camera 106, displaying what is currently within the view of camera 106. In this example, a box 1706 is also displayed within the preview window 1702. A cancel button 1720 is provided, which is selectable by the user to terminate the gray card calibration and lighting check and return to user interface 900, shown in FIG. 9.

Instruction window 1704 provides instructions to the user for the current operation. In this example, instruction window 1704 includes text-based instructions 1710 and an example image 1712. The text-based instructions 1710 prompt the user to follow three steps, including (1) zoom in all the way, (2) align the yellow box inside the large rectangle so that it looks like the picture below, and (3) trip the camera. The example image 1712 provides a graphical example of what the preview window 1702 should show when the camera is properly aligned and zoomed.

The user follows the instructions to adjust the zoom and position of camera 106 until box 1706 is positioned entirely within gray card 1514. The user then trips the camera, such as by selecting an image capture button on remote control 308. Upon selection of the image capture button, the setup module initiates the capture of two digital images.

Figure 19:
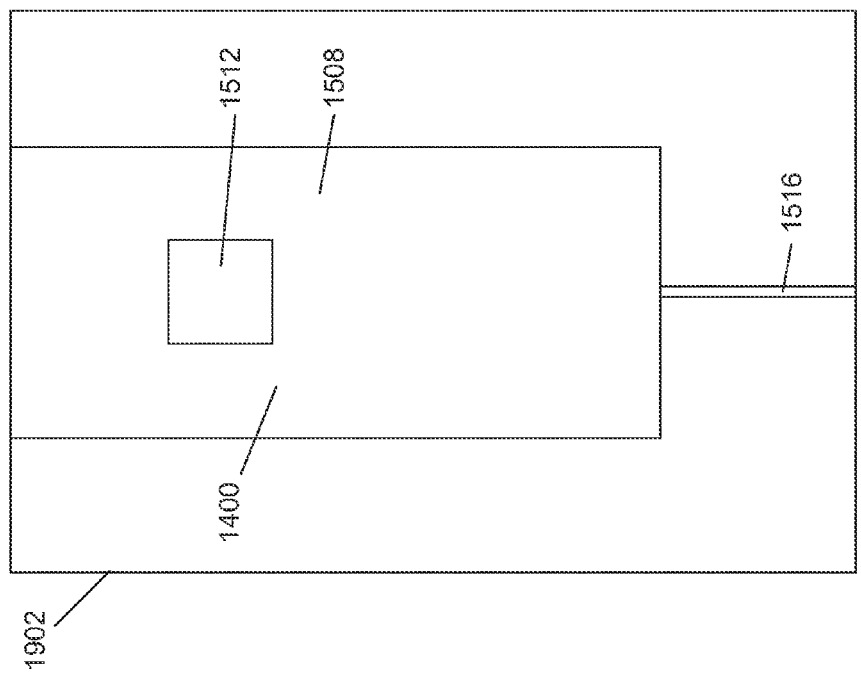
FIG. 19 is a schematic illustration of a second digital image captured by the photography station shown in FIG. 1.
Figure 18:
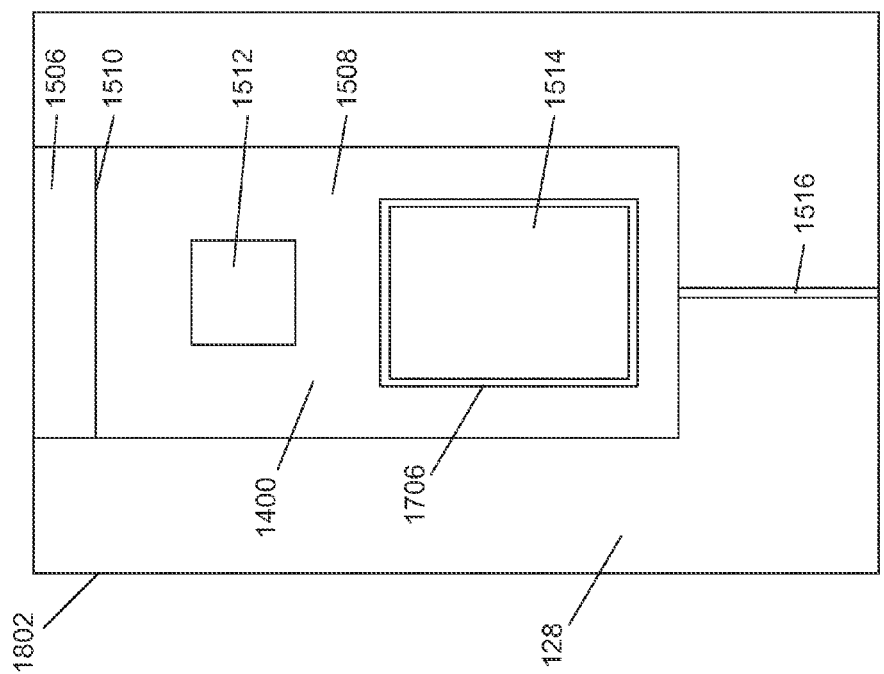
FIG. 18 is a schematic illustration of a first digital image captured by the photography station shown in FIG. 1.

FIGS. 18-19 are schematic illustrations of the first and second digital images captured for the gray card calibration and light test operations. When the first digital image 1802 is captured, shown in FIG. 18, the main light 118 and fill light 120 are illuminated. As a result, the gray card assembly 1400 is visible in the digital image along with the background 128. When the second digital image 1902 is captured, shown in FIG. 19, only the hair light 124 and background light 126 are illuminated. As a result, background 128 and window 1512 are visible in digital image 1902, as well as the silhouette of gray card 1400.

If gray card assembly 1400 includes a spatial frequency target 1518 (shown in FIG. 15), digital image 1802 also include a representation of the spatial frequency target 1518 therein.

In one example, digital images 1802 and 1902 are stored in a joint photographic experts group (JPEG) digital image format, such as using Red-Green-Blue (RGB) encoding. Other embodiments use other formats, such as exchangeable image file format (EXIF), tagged image file format (TIFF), raw image format (RAW), portable network graphics (PNG) format, graphics interchange format (GIF), bitmap file format (BMP), portable bitmap (PBM) format, or other digital file formats. The images are then processed by initial checking operation 1302 and background processing operation 1304.

Figure 20:
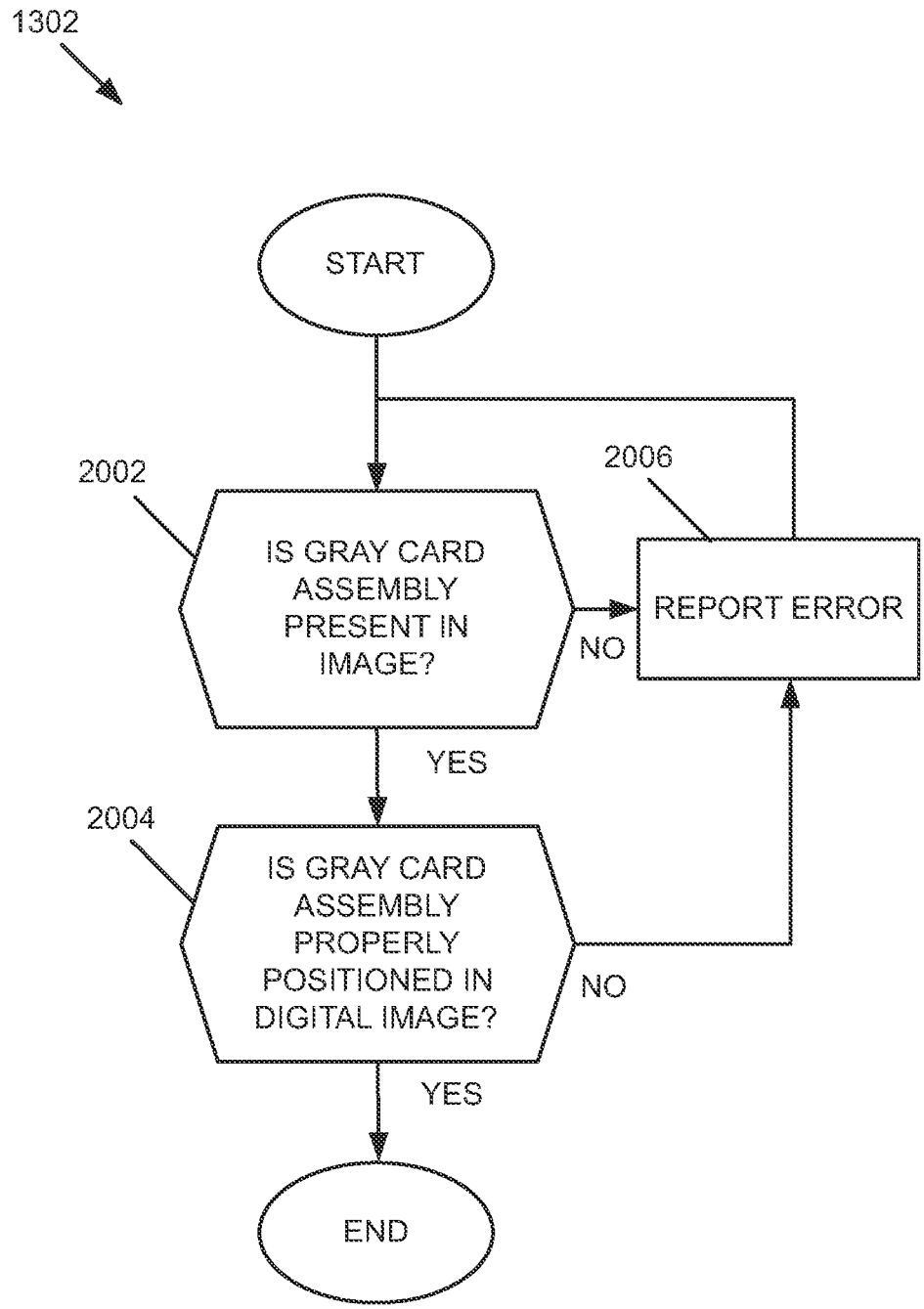
FIG. 20 is a flow chart illustrating an example initial checking operation of the setup module.
Figure 21:
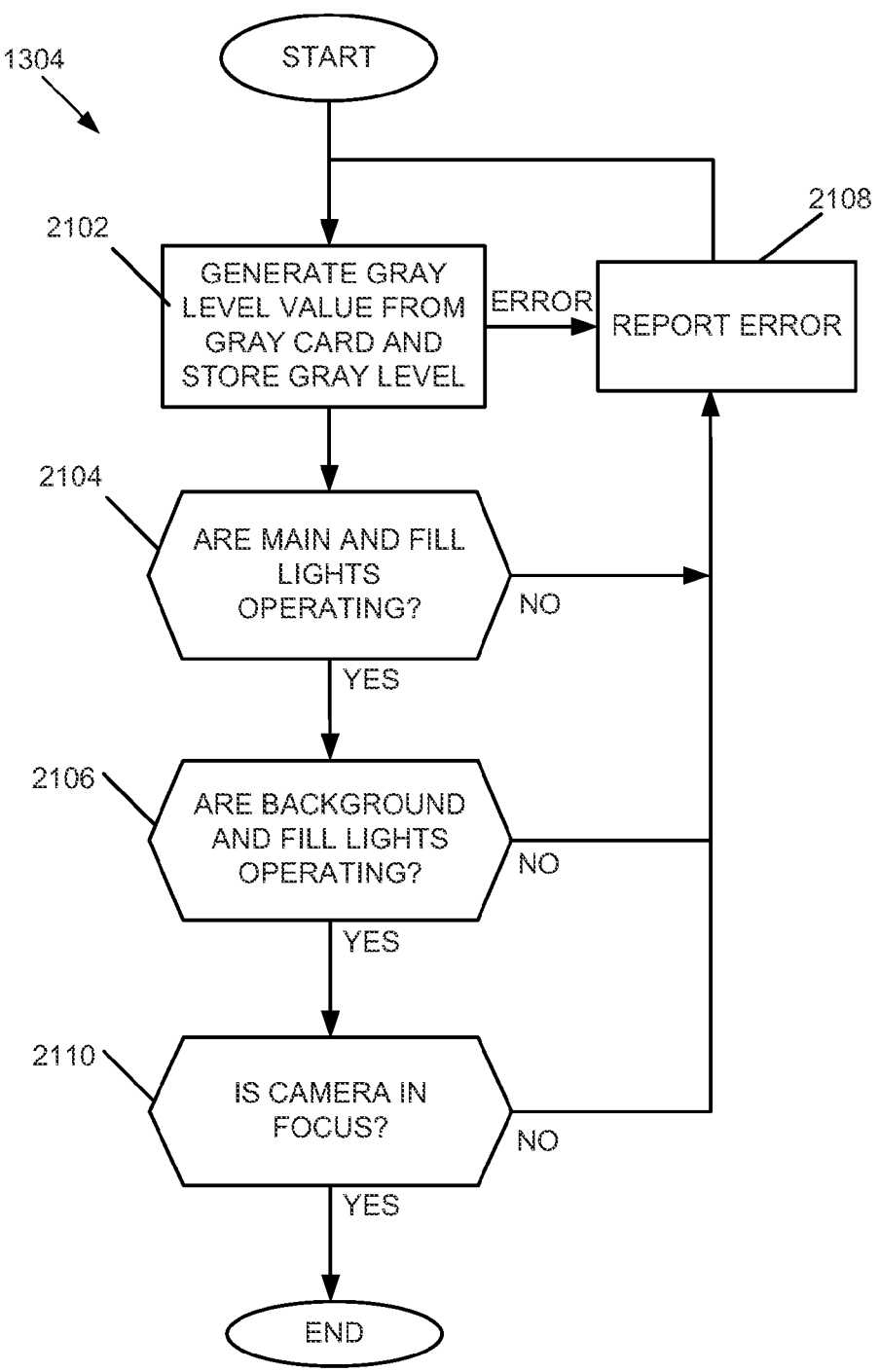
FIG. 21 is a flow chart illustrating an example background processing operation of the setup module.

FIGS. 20-21 illustrate examples of initial checking operation 1302 and background processing operation 1304.

FIG. 20 is a flow chart illustrating an example initial checking operation 1302, such as shown in FIG. 13. In this example, initial checking operation 1302 includes operations 2002, 2004, and 2006.

In some embodiments, after digital images 1802 and 1902 have been captured, initial checking operation 1302 performs quick processing on the images to confirm that the images are suitable for background processing operation 1304. Operation 2002 is first performed in some embodiments to determine whether the gray card assembly is present in the digital images.

In some embodiments the initial checking operation 1302 confirms that the gray card assembly 1400 is present in the digital image. For example, operation 2002 evaluates image 1802 to identify the black portions of body 1504 and then performs a pattern matching operation by comparing the identified black regions to an expected pattern. The expected pattern is based on the known shape and configuration of the gray card assembly 1400. If the shape of the black portions of body 1504 found in the digital image are found to sufficiently match the expected pattern, the gray card assembly is determined to be present within the digital image 1802. If a match is not found, operation 2002 determines that the gray card assembly 1400 is not present in the digital image and an error is reported to the user in operation 2006. The operation is repeated until the gray card assembly is identified or until the operation is terminated by the user, such as by selecting a cancel button 1720, shown in FIG. 17.

If the gray card assembly is found within the digital image, operation 2004 is then performed to determine whether the gray card assembly 1400 is properly positioned within the digital image.

Pattern matching is used in some embodiments. For example, in some embodiments a plurality of vertical strips of the digital image and a plurality of horizontal strips of the digital image are evaluated and compared to an expected pattern. As one specific example, five vertical strips of the digital image 1802 are evaluated, such as a left-most edge strip, a right-most edge strip, a left of gray-card assembly strip, a right of-gray card assembly strip, and a central vertical strip. A central vertical strip is compared to a pattern to confirm that image 1802 includes portions of body 1504, window 1512, and gray card 1514 and that another object is not obscuring the view of these portions of gray card assembly 1400. Five horizontal strips are similarly evaluated. Other embodiments utilize other numbers of strips, such as one, two, three, or more. By evaluating strips, rather than the entire image 1802, the speed of initial image processing is improved. In some embodiments background image 1902 is also or alternatively evaluated by operation 2004.

Some embodiments of operation 2004 identify the sides and/or bottom of gray card assembly 1400, such as using image 1902, and confirm that the sides and/or bottom are positioned within predetermined ranges within the digital images. Some embodiments identify the location of gray card 1514 and/or window 1512 and confirm that they are positioned within predetermined ranges of positions within the digital image 1902.

FIG. 21 is a flow chart illustrating an example background processing operation 1304, such as shown in FIG. 13. In this example, background processing operation 1304 includes operations 2102, 2104, 2106, and 2110. Error reporting is handled by operation 2108.

In some embodiments, if the initial checking operation 1302 completes successfully, background processing operation 1304 is performed on the digital images 1802 and 1902 to perform further gray card calibration and light check operations.

In this example, operation 2102 is first performed to generate a gray level value from the gray card. In this operation, the gray card 1514 in digital image 1802 is identified and processed. For example, a central portion (i.e., a region including about 50% of the area) of the gray card 1514 is identified in the digital image 1802 and an average color of all of the pixels within this central region is obtained. The average color is identified as the gray level calibration value of gray card 1514. In some embodiments the gray level calibration value is an RGB value. In some embodiments a brightness calibration value is also obtained by evaluating the gray card 1514 in a similar manner.

The gray level calibration value is stored in memory, such as within computing device 110 or within controller 108. The gray level calibration value can be used in subsequent processing to adjust for difference in color balance or brightness at the site where the photography station 100 is located.

When such gray level calibration values are determined by multiple different photography stations 100 (or by the same photography station 100 at different times), differences in brightness or color balance at various sites can be corrected in the digital images resulting in digital images with greater uniformity. For example if a photography station is placed at a site that has walls painted red, the colors within that room will be skewed toward red. This color imbalance will be reflected in the gray level calibration value, such that subsequent processing can be performed to adjust the color balance and reduce the amount of red in the images. For example, in some embodiments the gray level calibration value is used by the photography module 704 to generate an adjusted image in operation 2812, which is illustrated and described in more detail herein with reference to FIG. 28.

Light checks can also be performed with operations 2104 and 2106 using digital images 18-19, without requiring additional images to be captured. However, in other embodiments separate images are used and light checks are performed separate from gray card calibration operations.

A first light check is performed by operation 2104, which determines whether the main and fill lights are operating. Since the main and fill lights should have illuminated during the capturing of image 1802, that image can be used to confirm that the lights are operating correctly.

Figure 22:
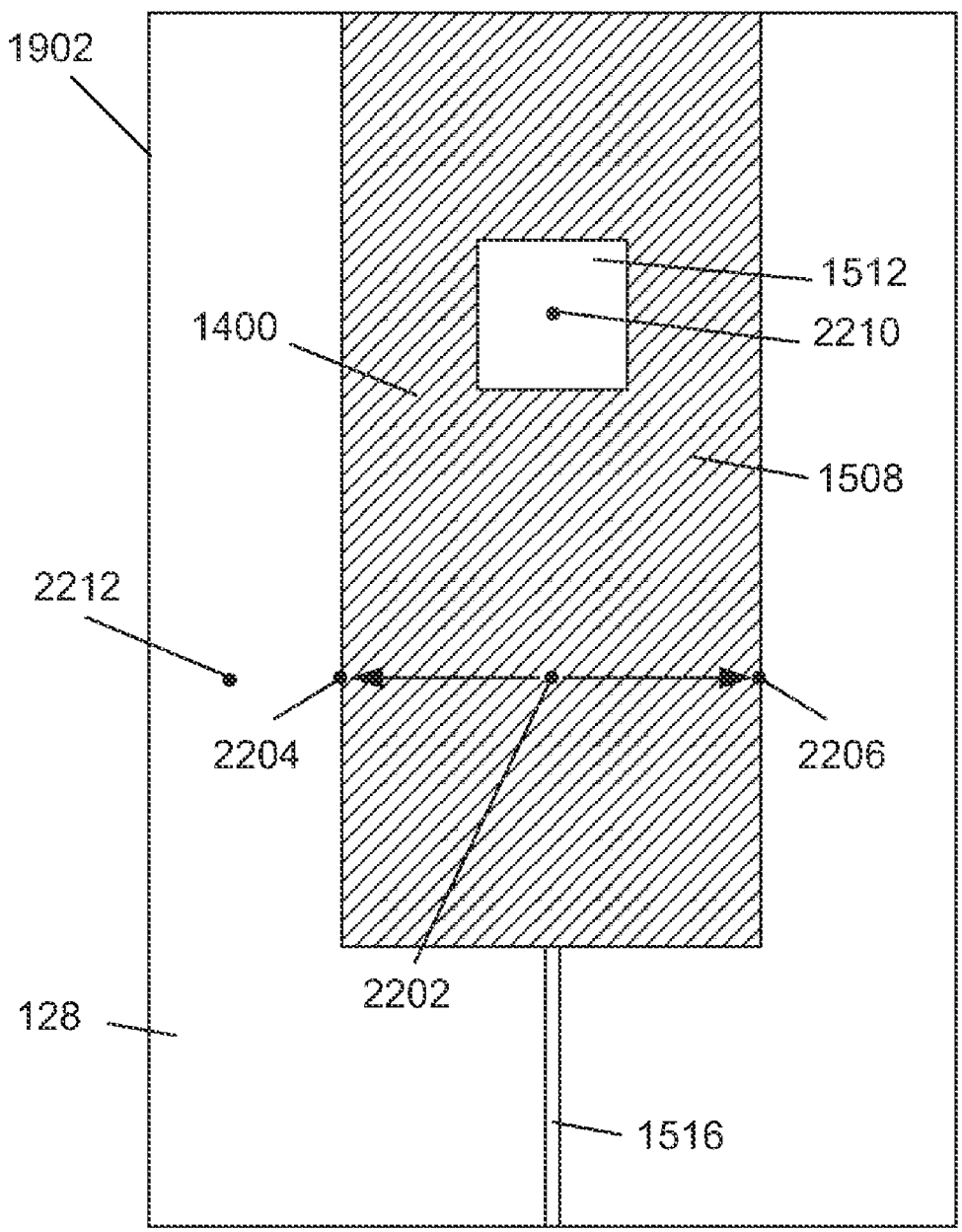
FIG. 22 is a schematic illustration of the second digital image shown in FIG. 19 being processed in an initial checking operation.

In one embodiment, the back lit image 1902 is first evaluated to find the left and right edges of gray card assembly 1400. Referring to FIG. 22, which shows image 1902, a starting point 2202 is first identified. In this example, a starting point is selected at the center of image 1902, approximately within the region of the gray card (which is not visible in image 1902 shown in FIG. 22). The image 1902 is then scanned to the left and to the right until transition points 2204 and 2206 are identified, where the illuminated background 128 becomes visible in digital image 1902 adjacent to gray card assembly 1400.

Figure 23:
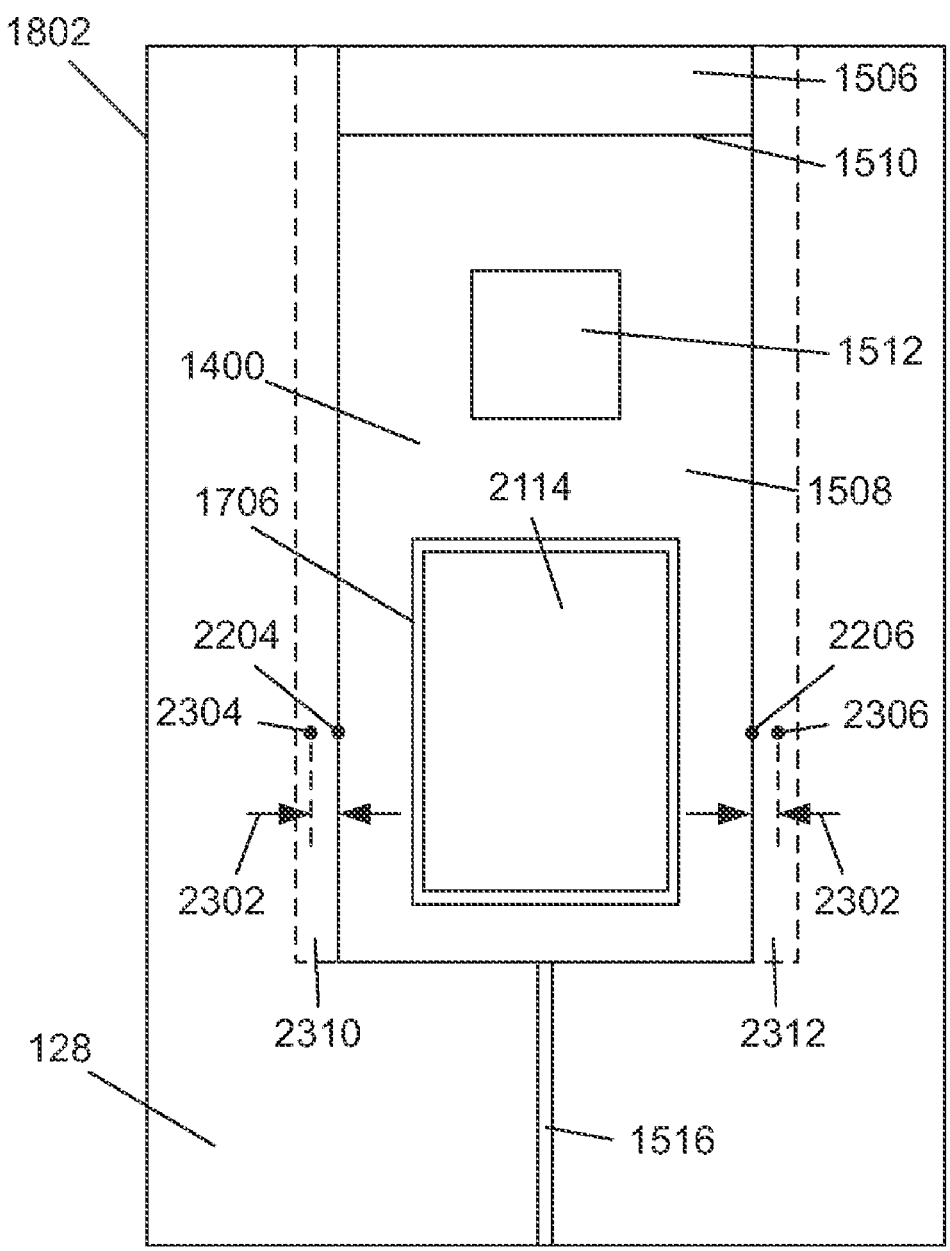
FIG. 23 is a schematic illustration of the first digital image shown in FIG. 18 being processed by an initial checking operation.

The left and right transition points are then used to identify light check regions in digital image 1802, shown in FIG. 23. FIG. 23 shows the front illuminated image 1802. After transition points 2204 and 2206 are identified in image 1902, the points are mapped to image 1802. Light check points 2304 and 2306 are then determined using an offset distance 2302. In an example embodiment, the offset distance is a number of pixels, such as in a range from about 10 pixels to about 100 pixels. In other embodiments offset distance 2302 has a distance outside of this range. Light check point 2304 is computed as the point that is a distance 2302 toward the left of transition point 2204. Light check point 2306 is computed as the point that is a distance 2302 toward the right of transition point 2206.

The light check points 2304 and 2306 can be used to determine whether or not the main and fill lights are operational. As shown in FIG. 2, the main light 118 is typically offset slightly to the left of camera 106 and the fill light 120 is typically offset to the right of camera 106. As a result, if one of main and fill lights 118 or 120 are not operating, a shadow will be cast by the gray card assembly 1400 against the unlit background 132, which will be visible in image 1802. For example, if the main light 118 does not fire, a shadow 2310 will be cast to the left of the gray card assembly 1400. If the fill light 120 does not fire, a shadow 2312 will be cast to the right of the gray card assembly 1400.

Accordingly, returning to FIG. 21, operation 2104 is performed in some embodiments by checking the color of the digital image at light check points 2306 and 2308 and comparing the color values. If the difference between the color values is greater than a threshold value, operation 2104 determines that one of the main or fill lights 118 or 120 is not operating, and identifies that light by determining which light check point 2306 or 2308 is darker than the other. If both color values are below a threshold value, operation 2104 determines that neither of lights 118 and 120 are operating.

Operation 2106 is then performed to determine whether or not the background light 126 and hair light 124 are operating. Such information can be determined by evaluating digital image 1902. For example, if hair light 124 correctly fired, window 1512 will be illuminated. Accordingly, the brightness of a point within window 1512 is evaluated to determine whether it is above a predetermined threshold value. Similarly, if background light 126 fired, the background 128 will be illuminated. Accordingly, the brightness of point 2212 outside of gray card assembly 1400 is evaluated, such as to determine if the brightness exceeds a predetermined threshold value.

In some embodiments operation 2110 is performed to determine whether the camera (i.e., lens, optical path, and/or CCD) are in focus. In some embodiments operation 2110 involves identifying a region of the digital image that includes the spatial frequency target 1518 of the gray card assembly 1400 (such as shown in FIG. 15). Once the region has been identified, a frequency analysis operation is performed on that region. The frequency analysis operation measures the highest frequency imaged in that region of the digital image and stores the frequency as a high frequency value. The high frequency value is then compared to a minimum frequency threshold. If the high frequency value is greater than the minimum frequency threshold, operation 2110 determines that the camera is in focus. If the high frequency value is less than or equal to the minimum frequency threshold, operation 2110 determines that the camera is not in focus, and an error is reported through operation 2108. The high frequency value is stored in memory.

If errors are detected, operation 2108 is performed to report the error to the user, such as in final reporting operation 810, shown in FIG. 13. If no errors are detected, background processing operation 1304 is completed. The gray card assembly 1400 is then removed by the operator.

Figure 24:
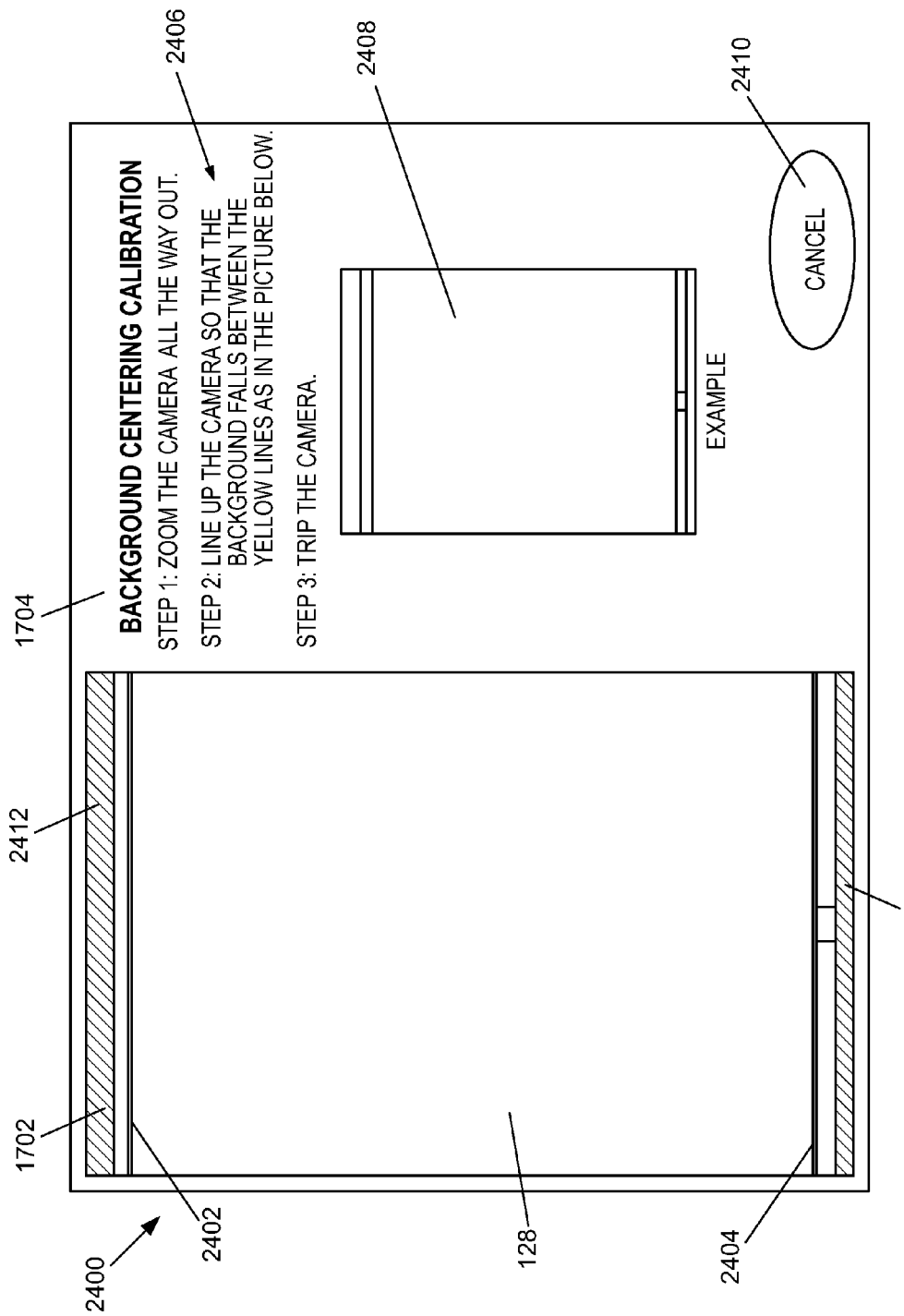
FIG. 24 is a screen shot of another example user interface of the setup module.

FIG. 24 is a screen shot of an example user interface 2400 that is used to begin a background calibration operation, such as including operations 1306 and 1308, shown in FIG. 13.

User interface 2400 includes preview window 1702 and instruction window 1704. In this example, preview window 1702 further includes guide lines 2402 and 2404. Instruction window 1704 includes instructions 2406 and example image 2408. A cancel button 2410 is provided, which is selectable by the user to terminate the gray card calibration and lighting check and return to user interface 900, shown in FIG. 9.

In this example, instructions 2406 prompts the user to follow three steps, including: (1) zoom the camera all the way out, (2) line up the camera so that the background falls between the yellow lines as in the picture below, and (3) trip the camera. Example image 2408 provides a graphical example of what the preview window 1702 should show when the camera is properly aligned and zoomed.

The user follows the instructions to adjust the zoom and position of camera 106 until the background 128 is positioned completely between guide lines 2402 and 2404. Upon selection of the image capture button, the setup module initiates the capture of a background calibration image, such as the image shown in preview window 1702. In some embodiments only the background light 126 is used during the capturing of the background calibration image.

After the image has been captured, the background calibration image is processed using initial checking operation 1306 and background processing operation 1308, as shown in FIG. 13.

In one example embodiment, the initial checking operation 1306 checks the top and bottom of the background calibration image to confirm that dark regions 2412 and 2414 are present at the top and the bottom of the image, to confirm that the camera was zoomed and positioned as requested by instructions 2406. If the instructions are followed, the image should include within the digital image dark areas that are above and below the background 128. The top and bottom edges of the background are also identified in some embodiments by locating the transition between the relatively bright background 128 and the dark regions 2412 and 2414. Initial checking operation 1306 confirms that such dark regions 2412 and 2414 are present. If the dark regions 2412 and 2414 are not present, an error is reported to the operator.

If the initial checking operation 1306 is completed successfully, operation 1308 is next performed to further process the digital image. In some embodiments, operation 1308 checks the background and generates a background calibration value. The operation begins by identifying the region of the digital image that contains the background. The top and bottom of the background (identified in operation 1306) can be used for this purpose, the background being determined to be the space between the top and bottom in the digital image.

Next, in some embodiments the background is processed in a similar manner as the gray card, discussed above. For example, the background within the image is divided into various regions, such as having a grid pattern including a plurality of columns and rows. In one example, a grid of eight columns and twelve rows is used. Each area within the grid is then processed separately to determine an average brightness (or color) value within that region. Because the background should be substantially uniform, if a large brightness difference is identified within any given region, an error is reported.

The error indicates that either there is a problem with the background 128 (i.e., a smudge, tear, or other blemish) or that there is another object between the camera 106 and the background 128. After each region has been processed, the average color values are compared to see if there are any substantial gradients between the regions. If so, an error is reported. If none, an average brightness value is generated and stored as the background calibration value. In another embodiment, a maximum and minimum brightness value are stored that represent the range of brightness values. The background calibration value is used in some embodiments for subsequent processing of digital images, such as to identify the background 128 within an image and to remove it. If any errors are detected, such errors are reported to the user, such as through final reporting operation 810, shown in FIG. 13.

Figure 25:
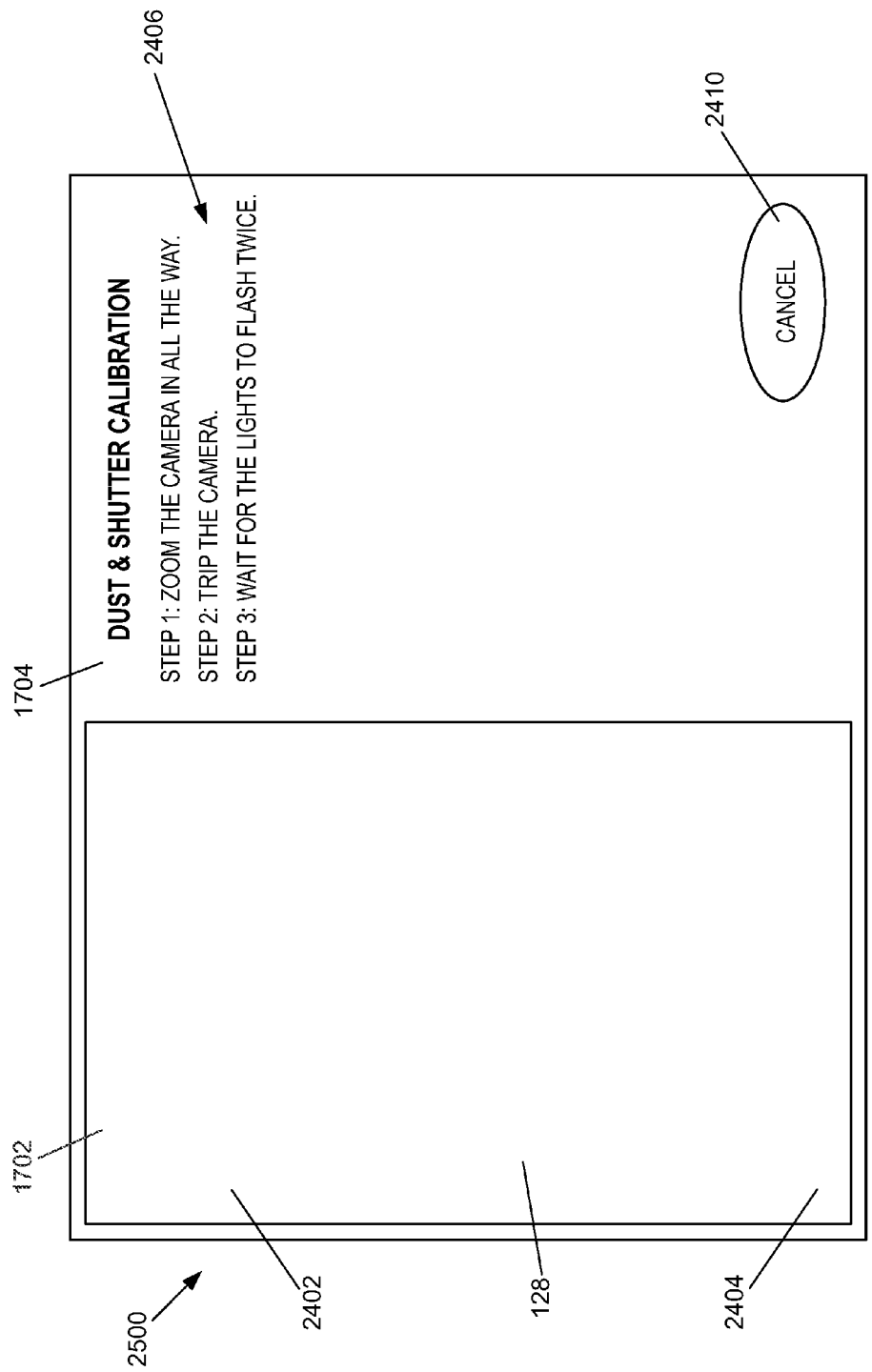
FIG. 25 is a screen shot of another example user interface of the setup module.

FIG. 25 is a screen shot of an example user interface 2500 that is used to begin dust and shutter check operations, such as including operations 1310, 1312, 1314, and 1316.

User interface 2500 includes preview window 1702 and instruction window 1704. In this example, instruction window 1704 includes instructions 2502. A cancel button 2410 is also provided, which is selectable by the user to terminate the dust and shutter check operations and return to user interface 900, shown in FIG. 9.

Instruction window 2502 provides instructions to the user for the current operation. In this example, instruction window 2502 prompts the user to follow three steps, including: (1) zoom the camera in all the way, (2) trip the camera, and (3) wait for the lights to flash twice.

The user follows the instructions to adjust the zoom and position of camera 106 accordingly, and then the user trips the camera, such as by selecting an image capture button on remote control 308. Upon selection of the image capture button, the setup module initiates the capture of two digital images including a dust check image and a shutter check image.

The dust check image is used by the dust check operations (such as operations 1310 and 1312, shown in FIG. 13) and the shutter check image is used by the shutter check operations (such as operations 1314 and 1316), as discussed below. When the dust check image is captured, at least the background light 126 is typically used to illuminate the background 128, although other lights are used in other embodiments. When the shutter check image is captured, the main, fill, and background lights are used in some embodiments to fully illuminate the background. The shutter of camera 106 is closed while the shutter check image is captured.

In some embodiments, the dust check operation includes an initial check operation 1310 and a background processing operation 1312. As noted above, when the dust check image is captured the camera 106 is fully zoomed onto the background 128. The camera 106 is also unfocused. When in this configuration, any dust or other blemishes on the camera lens will be detectable as a dark area in the dust check image.

Before the dust check is performed by background processing operation 1312, however, the initial check operation 1310 is performed to confirm that the camera has been adjusted. In one embodiment, operation 1310 confirms that dark regions 2412 and 2414 (shown in FIG. 24) that were found in the background calibration image, are no longer present in the dust check image. If no dark regions are found, operation 1310 determines that the camera has been zoomed in as instructed. In some embodiments additional checks are performed, such as to confirm that no large color or brightness gradients are present in the digital image. If dark regions are found or other errors are detected, the error is reported to the user. If operation 1310 is successful, operations 1312 and 1314 are then performed.

Operation 1312 performs background processing on the dust check image, such as to determine whether any dust or other blemishes are present on the lens of camera 106. As one example, an average brightness value over a range of pixels is first computed. Next, each pixel in the digital image is compared to the average brightness value to determine whether any pixel's brightness deviates substantially from the average brightness value. If so, an error is reported, such as through final reporting operation 810, shown in FIG. 13.

Operation 1314 performs initial processing of the shutter check image. In one example, the initial processing operation 1314 performs a quick check on the image to confirm that the image is generally dark, such as by sampling several points within the image. If the shutter of camera 106 is functioning properly, little or no light should pass through the shutter when the shutter check image is captured. As a result, the shutter check image should be completely dark. If light is detected in the image with operation 1314, an error is reported.

Operation 1316 performs background processing of the shutter check image to further confirm that the shutter is operating properly. In one example, the brightness of each pixel in the shutter check image is checked to confirm that the pixel is dark. If the brightness of one or more pixels exceeds a predetermined value, operation 1316 determines that the shutter is not operating properly. For example, the shutter is not closing completely. An error is then reported to the user, such as through final reporting operation 810, shown in FIG. 13.

Figure 26:
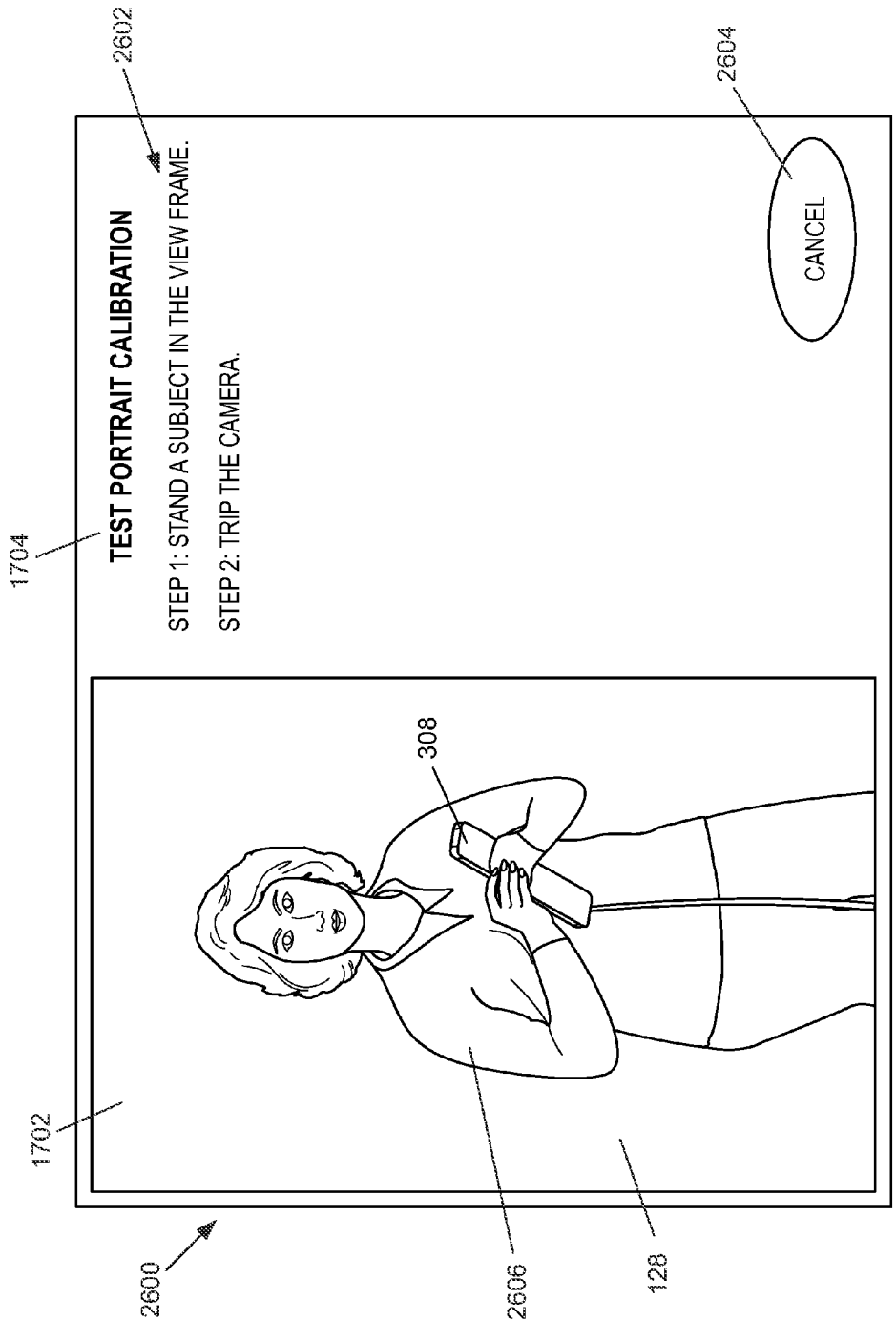
FIG. 26 is a screen shot of another example user interface of the setup module.

FIG. 26 is a screen shot of an example user interface 2600 that is used to begin a system check operation, such as including operations 1318 and 1320, shown in FIG. 13.

User interface 2600 includes preview window 1702 and instruction window 1704. In this example, instruction window 1704 includes instructions 2406 that prompt the user to follow two steps, including: (1) stand a subject in the view frame, and (2) trip the camera. A cancel button 2604 is also provided in user interface 2600, which is selectable by the user to terminate the gray card calibration and lighting check and return to user interface 900, shown in FIG. 9.

The user follows the instructions to have a subject 2602 (i.e., the user) stand so that she is visible in preview window 1702. When subject 2602 is properly positioned, the user presses the image capture button of the remote control 308 to initiate the image capture process. The setup module then initiates the capture of two images, including a foreground lit test image and a background lit test image. When the foreground lit image is captured, the main light 118, fill light 120, and hair light 124 are all used. A moment later the background lit test image is captured, during which only the background light 126 is used.

In some embodiments, the system check operation involves an initial processing operation 1318 and a background processing operation 1320. In another embodiment, no initial processing operation 1318 is performed for the system check operation.

Initial processing operation 1318 performs a quick test to confirm that the foreground lit test image and the background lit test image were properly captured. For example, in some embodiments a region within the center of the background lit test image is tested to ensure that a subject is present, by confirming that a center of the image is dark and an outer region of the digital image is light. If so, the foreground lit image is also checked to confirm that at least a minimal color difference is present within the region of the subject. If so, the initial processing operation 1318 is completed successfully and further processing is performed by background processing operation 1320.

Background processing operation 1320 begins by identifying the location of the subject. This is done, for example, by identifying all dark areas within the background lit digital image. Once the location of the subject is determined, the foreground lit test image is then processed to generate a background replaced image that includes data from the subject in the foreground lit image and a blank background around the subject. In one embodiment, the blank background is a black background. Further information about a suitable background replacement process that can be performed by operation 1320 is described in U.S. Pat. No. 7,834,894, titled METHOD AND APPARATUS FOR BACKGROUND REPLACEMENT IN STILL PHOTOGRAPHS, issued on Nov. 16, 2010, the disclosure of which is hereby incorporated by reference in its entirety.

Figure 27:
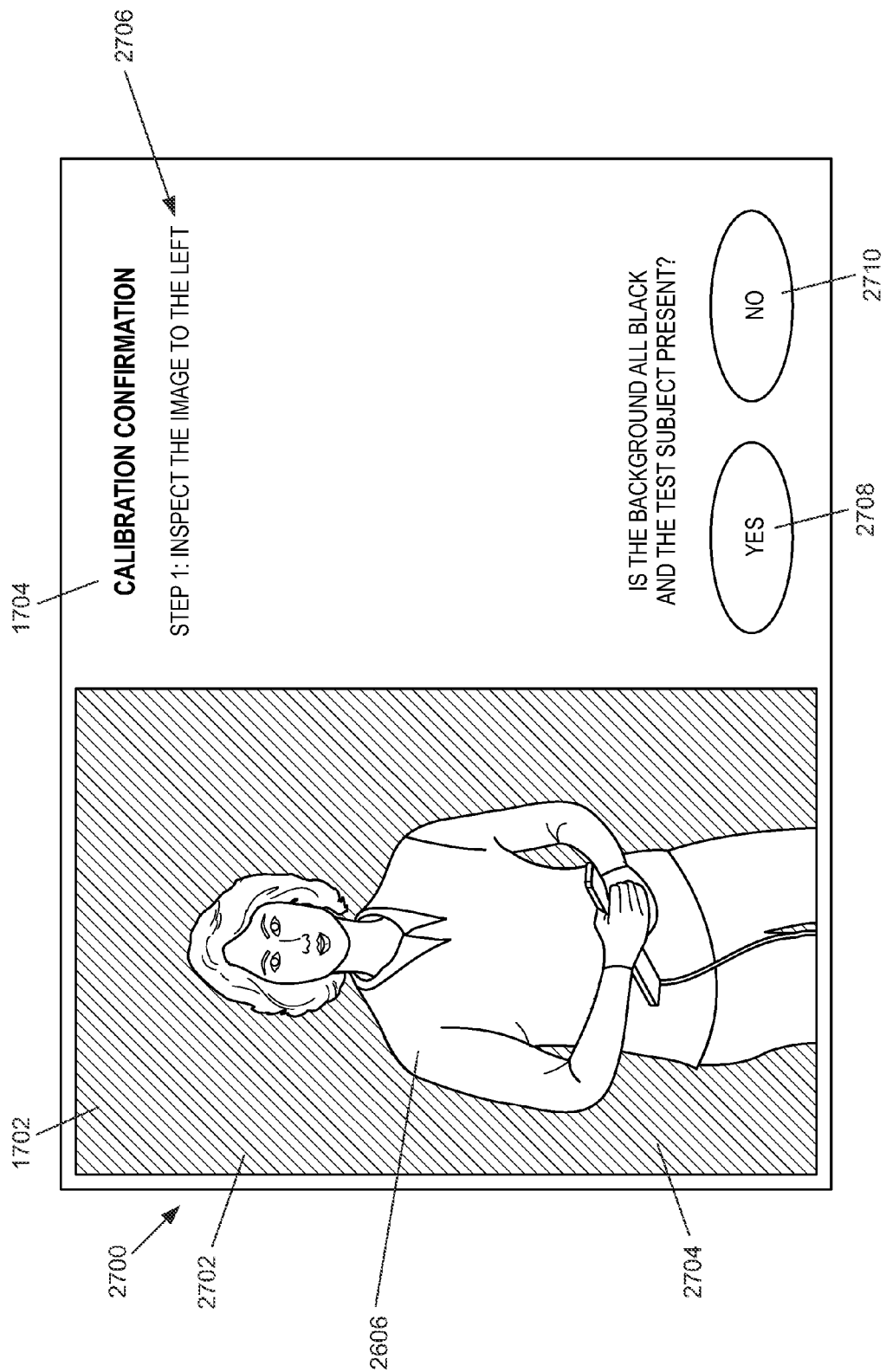
FIG. 27 is a screen shot of another example user interface of the setup module.

FIG. 27 is a screen shot of an example user interface 2700 that displays the background replaced image 2702 to the user, such as after background processing operation 1320, shown in FIG. 13, has been completed. User interface 2700 includes preview window 1702 and instruction window 1704. As discussed above, background replaced image 2702 includes the subject 2606 and a blank background 2710.

Instruction window 1704 includes instructions 2706 that prompt the user to inspect the background replaced image 2702 and to determine whether the background is all black and the test subject is present. If so, the user is prompted to select button 2708. When button 2708 is selected, the setup module determines that setup has been successfully completed. If not, the user is prompted to select button 2710, in which case an error is reported to the user, such as through final reporting operation 810, shown in FIG. 13. In some embodiments the setup module restarts at operation 1302 if an error is detected in system check operation 1320. In other embodiments only certain operations are repeated as necessary. For example, in some embodiments the user is prompted to enter additional information about the problem that is visible in the background replaced image 2702 that caused the user to select button 2710. Those operations associated with the problem identified by the user are then repeated as necessary until the error has been resolved or the setup module is terminated by the user.

This completes the description of example embodiments of the setup module 702 and associated methods and operations that are performed in some embodiments to setup and calibrate a photography station 100 to capture digital images.

Figure 28:
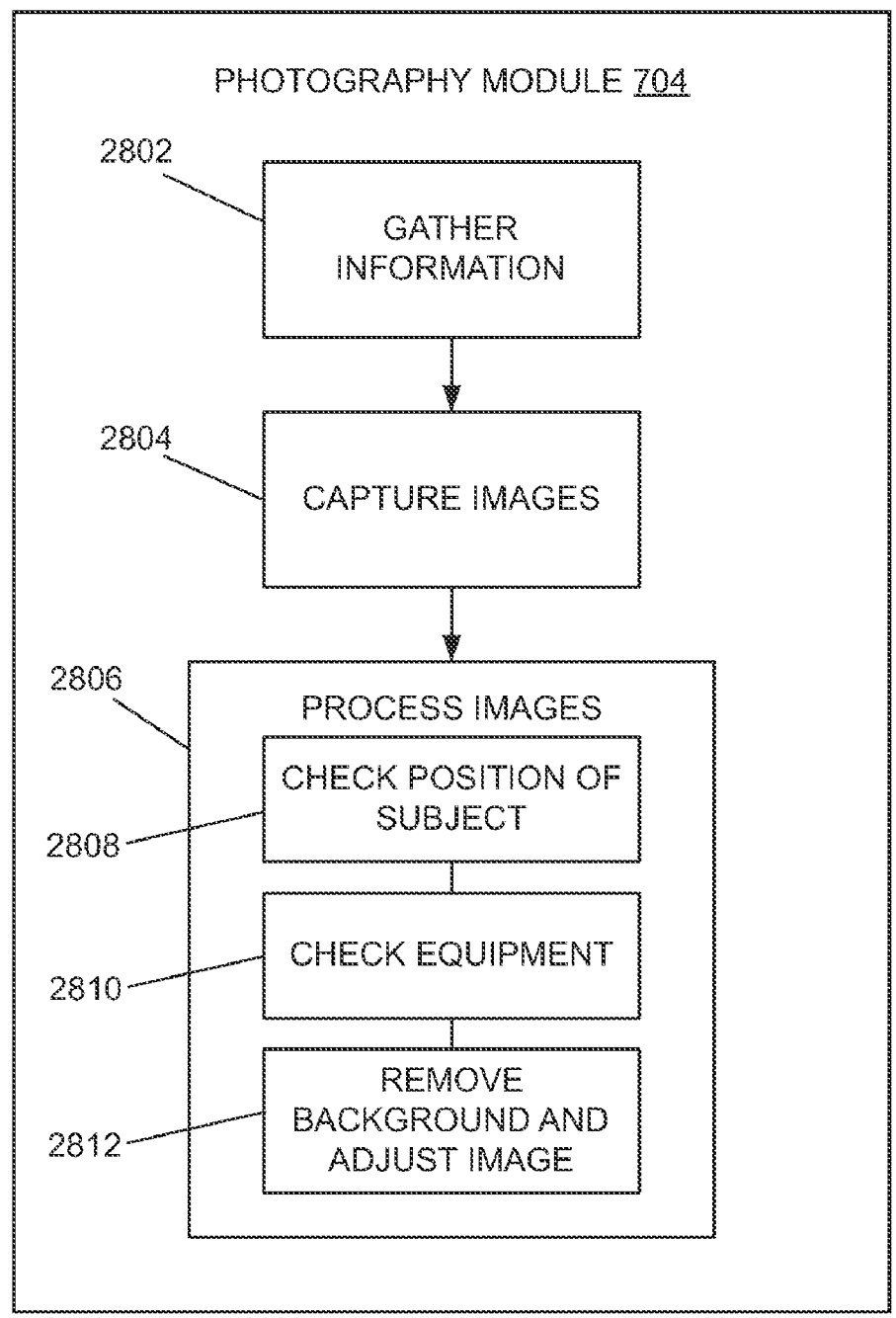
FIG. 28 is a schematic block diagram of an example photography module.

FIG. 28 is a block diagram of an example photography module 704. As shown in FIG. 3, the photography module is typically activated after the setup module 702 has been completed successfully.

In this example, photography module 704 performs a method of photographing one or more subjects. The method includes operation 2802 that gathers information, operation 2804 that captures images, and operation 2806 that processes the images.

Operation 2802 is first performed in some embodiments to gather information. An example of operation 2802 is illustrated and described with reference to FIG. 29. In some embodiments, operation 2802 gathers information about the subject and/or about an order placed by the subject for final products (such as printed photographs, electronic photographs, or other products). In some embodiments operation 2802 is performed with an input device and a computing device 110 (such as shown in FIG. 1).

Operation 2804 is then performed to capture digital images. In some embodiments, operation 2804 is performed by a computing device, a controller, and/or a digital camera. For example, in some embodiments operation 2804 involves sending a message from computing device 110 to camera 106 (such as shown in FIG. 1) to cause camera 106 to capture one or more digital images of the subject. The one or more digital images are then received from the camera 106 at the computing device 110.

Figure 29:
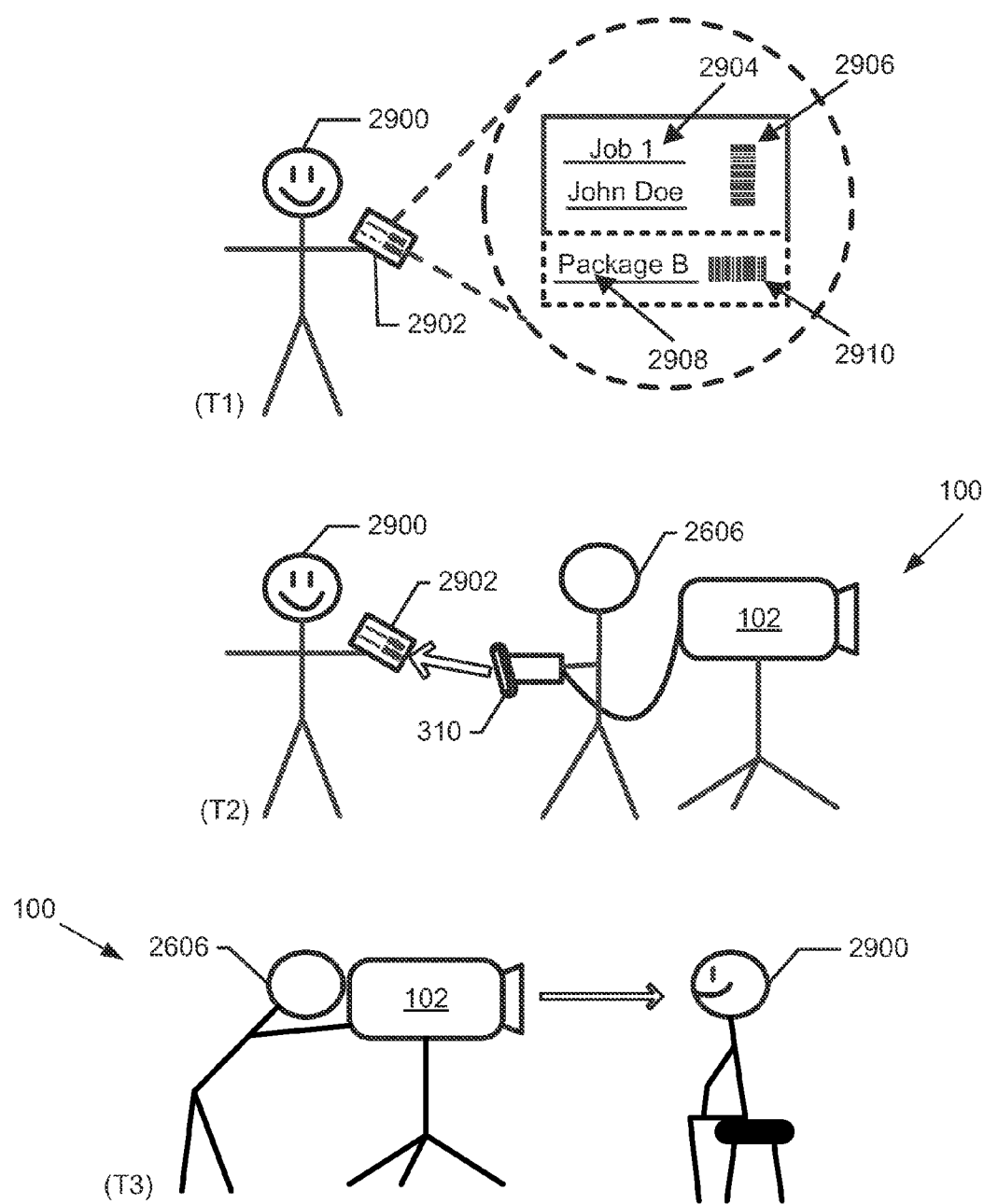
FIG. 29 illustrates an example method of capturing digital images of a subject using the photography station 100, shown in FIG. 1.
Figure 30:
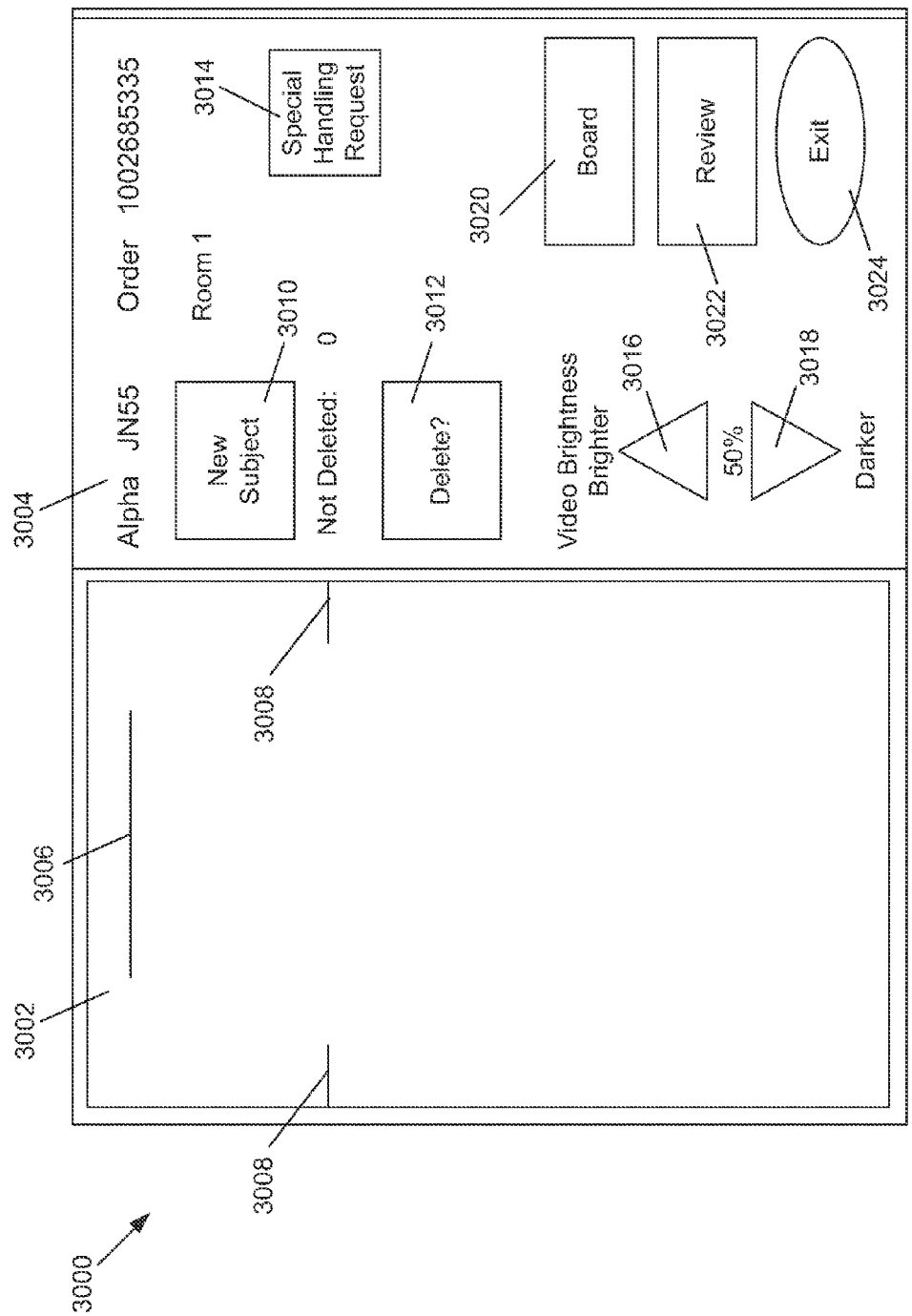
FIG. 30 is a screen shot of an example user interface of a photography module.
Figure 31:
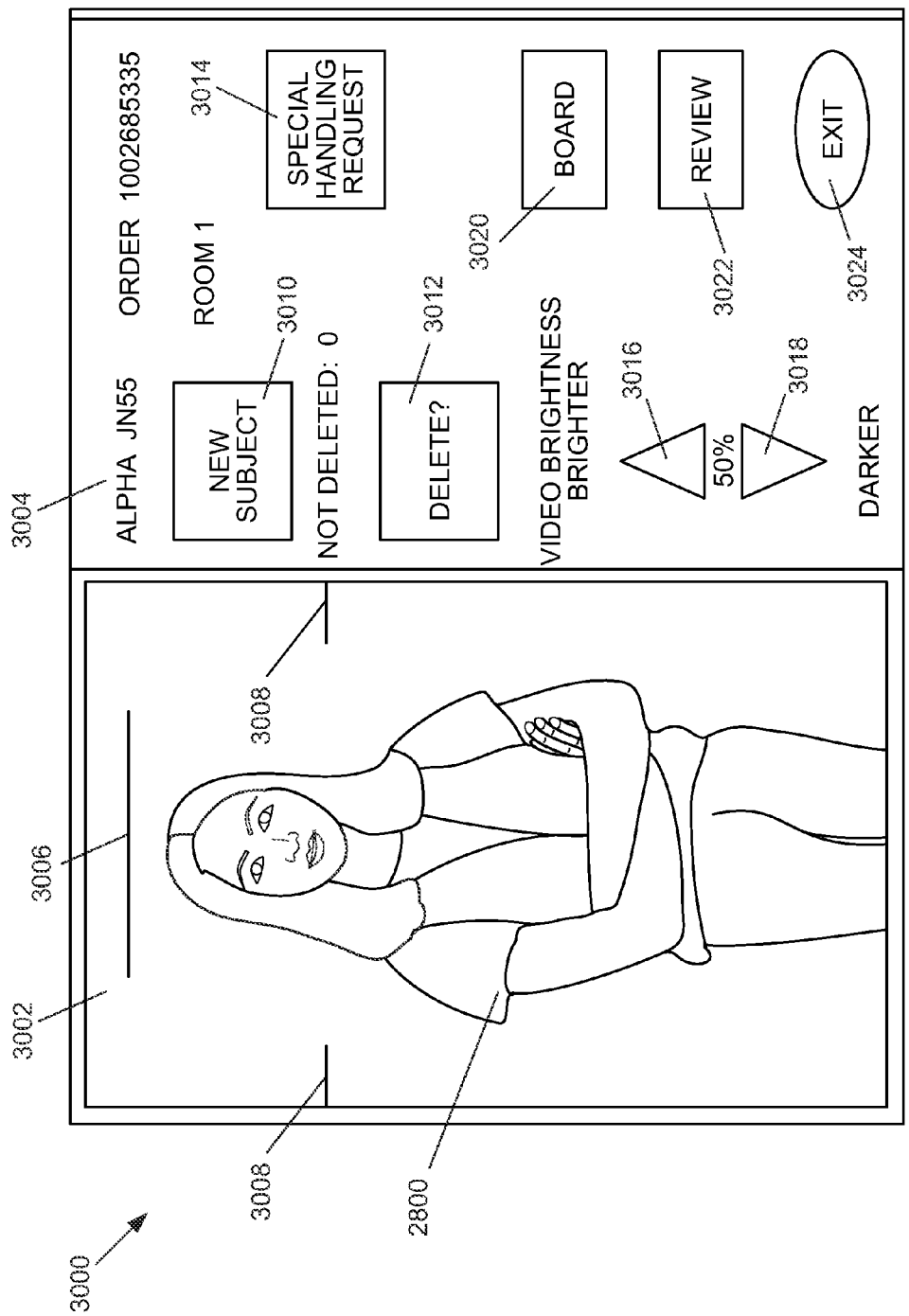
FIG. 31 is a screen shot of the example user interface shown in FIG. 30, showing a subject that is properly positioned within a preview window.

An example of operation 2804 is illustrated and described herein with reference to FIG. 29 (time T3) and with reference to FIGS. 30-31. In some embodiments, each time the photographer initiates an image capture, two digital images are captured. The first is a foreground lit image and the second is a background lit image.

Operation 2806 is then performed to process the images captured in operation 2804. In this example, processing operation 2806 includes operation 2808 that checks the position of the subject in the one or more digital images. For example, in some embodiments a height check is performed to confirm that the top of the subject's head is correctly positioned within the digital image, such as between an upper guide line and a lower guide line. An example is illustrated and described herein with reference to FIGS. 30 and 32. In another embodiment, the edges of the digital image are checked to confirm that the subject does not extend into the left-most or right-most edges of the digital image. For example, the background lit image is reviewed to confirm that all (or a portion) of the pixels along the left and right edges of the background lit image include the background and that no portion of the edges is dark. Because the background lit image does not utilize the foreground lighting, the subject will appear as dark pixels in the background lit image. If such dark pixels are present at the edges of the digital image, operation 2806 determines that the subject is not properly positioned and the photographer is prompted to reposition the subject and retake the picture. Other embodiments include other position checks, such as to confirm that the top and bottom of the background are not present in the digital image, or alternatively to confirm that the top and bottom of the background are present in the image (in which case the digital image is subsequently cropped to remove the top and bottom portions). Such processing is similar to operations 1306 and 1308, discussed herein.

Operation 2810 is also performed in some embodiments to check equipment operation. For example, in some embodiments the background lit image is evaluated to confirm that the background light 124 correctly fired. In another possible embodiment the background is evaluated to confirm that the background is present and has the color (i.e., gray) and/or brightness that is expected, such as within a predetermined range of permissible values. In some embodiments the values stored by the setup module are compared to the presently measured values to confirm that they are sufficiently similar.

If the prior processing operations 2808 and 2810 complete successfully, photography module 704 next performs operation 2812 to remove the background from the foreground lit image and adjust the image as needed. For example, the background lit image is first evaluated to identify the location of the subject in the digital image (i.e., dark pixels). The foreground lit image is then processed to remove the background (i.e., those pixels that were light in the background lit image). The process of removing the background is described in more detail in U.S. Pat. No. 7,834,894, titled METHOD AND APPARATUS FOR BACKGROUND REPLACEMENT IN STILL PHOTOGRAPHS, issued on Nov. 16, 2010.

In addition, some embodiments perform further processing to adjust the image. For example, in some embodiments the brightness or color of the image is adjusted based on data collected by the setup module 702. For example, if the setup module 702 determined that the colors at the photography site were tinted toward red (or another color), a color balancing operation is performed on the digital image to adjust the color balance, such as to remove the red tint from the image. If the setup module 702 determined that the site was extra bright, the image is adjusted to reduce the brightness of the digital image.

After the background has been removed and the image is adjusted, the resulting adjusted image is displayed to the user, such as with user interface 3000, shown in FIG. 30. If the adjusted and background removed image is acceptable, the user need not take any further action and the computing device 110 takes this as an indication that operation 2812 was successful. The adjusted image is stored in memory. If the image is not acceptable, the user selects the delete button 3012 (shown in FIG. 30) to delete the image and repeat operations 2804 and 2806.

In some embodiments, after the original image has been processed to generate the adjusted image, the original image data (including the original foreground lit image and the original background lit image) is discarded, and only the final adjusted image is stored. This reduces the total storage space required to store the digital images (because only a single image is stored rather than two or more images, and/or because the background image data is not stored in some embodiments). The multiple checking operations (i.e., 2808, 2810, and 2812) provide a high degree of confidence that the adjusted image has been properly captured and therefore the original image data is no longer necessary. However, in other embodiments the original image data is stored prior to processing operation 2806 and processing operation 2806 is performed at a later time, such as at a photograph processing lab.

FIG. 29 illustrates an example method of gathering information and capturing digital images of a subject using photography station 100. The method begins when a subject 2900 is provided with a data card 2902. In some embodiments data card 2902 identifies the subject 2900, such as with the subject's name 2904 or identification number. In some embodiments a barcode 2906 is also provided to identify the subject 2900, or to identify the data card 2902 that is associated with the subject 2900. In some embodiments data card 2902 includes order data 2908, such as including an identification of a package that has been already purchased or that the subject 2900 wants to purchase, or other order information. A barcode 2910 is included in some embodiments to identify the order data 2908 in a machine-readable format, or to identify the data card 2902 that includes the order information.

At time T2, the subject 2900 approaches photography station 100 and hands the data card 2902 to the user 2606 (i.e., the photographer), who scans the barcodes 2906 and 2910 using the barcode scanner 310 of the image capture and control system 102, which receives data, such as the subject information 2904 and the order information 2908.

At time T3, subject 2900 is posed in photography station 100 and one or more images are captured using image capture and control system 102.

FIG. 30 is a schematic screen shot of an example user interface 3000 of a photography module 704, such as used by the operator while an image of a subject is being captured (i.e., operation 2804, shown in FIG. 28). User interface 3000 includes preview window 3002 and control panel 3004. Preview window includes upper guide line 3006, and lower guide lines 3008. Control panel 3004 includes new subject button 3010, delete button 3012, special handling button 3014, brightness adjustment controls 3016 and 3018, board button 3020, review button 3022, and exit button 3024.

In some embodiments, preview window 3002 displays a video feed preview from camera 106. The preview window 3002 allows the user to see in real-time or substantially real time a preview of an image that the camera 106 will capture if the image capture button is selected at any given moment.

In this example, preview window 3002 includes guide lines 3006 and 3008 that assist the user in properly positioning the camera with respect to the subject. When a subject is present, as shown in FIG. 31, the top of the subject's head should be positioned below upper guide line 3006 but above the lower guide lines 3008. In addition, the bottom of preview window 3002 should be positioned at approximately the thigh of the subject. If the top of the user's head is not between the guide lines 3006 and 3008, or the subject's thigh is not at the bottom of preview window 3002, the zoom and height of camera 106 are adjusted until the subject is properly positioned within preview window 3002.

As discussed herein, the angle of camera 106 with respect to the supporting tripod (and therefore to the ground) is fixed in some embodiments. The fixed angle of camera 106 ensures that if the subject is properly positioned within preview window 3002 (as discussed above), then the camera must be sufficiently zoomed in on the subject. This results in higher quality images because the subject will be represented by more pixels in the resulting digital images than if the camera was further zoomed out from the subject.

In some embodiments, photography module 704 performs a position check after a digital image is captured to confirm that the subject 2900 is properly positioned. Examples of the position check are described in more detail with reference to FIGS. 30-31.

Control panel 3004 includes various controls that can be selected by the operator to adjust the operation of photography module 704. New subject button 3010 is selected by the user to indicate to the photography module that a new subject is about to be photographed. In some embodiments the new subject button 3010 causes the user interface to prompt the user to scan a data card 2902, such as shown in FIG. 29 at time T2.

After an image is captured, the digital image is briefly displayed to the user in preview window 3002. If the user does not like the image, the delete button 3012 can be selected. Once selected, the photography module deletes the digital image, or marks the image for subsequent review and/or deletion.

If a unique circumstance will not allow the user to properly position the user as discussed above (i.e., so that the top of the subject's head is between guide lines 3006 and 3008), the special handling button 3014 is selected by the user. Once selected, the photography station will allow the user to proceed with capturing the digital images. Therefore, the special handling button 3014 operates as a manual override in some embodiments.

A brightness of the image in preview window 3002 can be adjusted by the user by selecting the brighter button 3016 or the darker button 3018. Upon selection of these buttons, the photography module increases or decreases the brightness of the video feed in preview window 3002 accordingly. In some embodiments the brightness controls 3016 and 3018 do not change or adjust the actual digital images that are captured.

Board button 3020 is provided to allow the user to identify a next digital image as containing an informational board. For example, in some embodiments information about the photography session is written on a board, such as a whiteboard or chalk board. The board is then placed in front of the camera and a digital image is captured. This provides a convenient way of storing information associated with the digital images. When the board button is selected, the photography module prompts the user to identify the type of board (such as a start of session board, a new room board, or an end of session board). In some embodiments a board contains information such as the date and time, an identification of the user (i.e., photographer), and any other desired information.

If a user wants to review the images that have been captured, the review button 3022 is selected. Upon selection of the review button 3022, photography module 704 generates a user interface including a thumbnail of one or more digital images that have been captured. In some embodiments the user interface provides controls to allow the user to scroll through the images, and to delete (or mark for subsequent deletion) selected images. Image editing controls are provided in some embodiments.

After a photography session has been completed, the exit button 3024 is selected. Upon selection of exit button 3024 the photography module 704 ends and user interface 900, shown in FIG. 9 is displayed to the user.

FIG. 31 is a screen shot of the user interface 3000, shown in FIG. 30, and further illustrating a subject that is properly positioned within preview window 3002. In this example, the top of the subject's head is properly positioned between upper guide line 3006 and lower guide lines 3008. Accordingly, a position check performed by photography module 704 determines that the subject is properly positioned and no further action is necessary.

Figure 32:
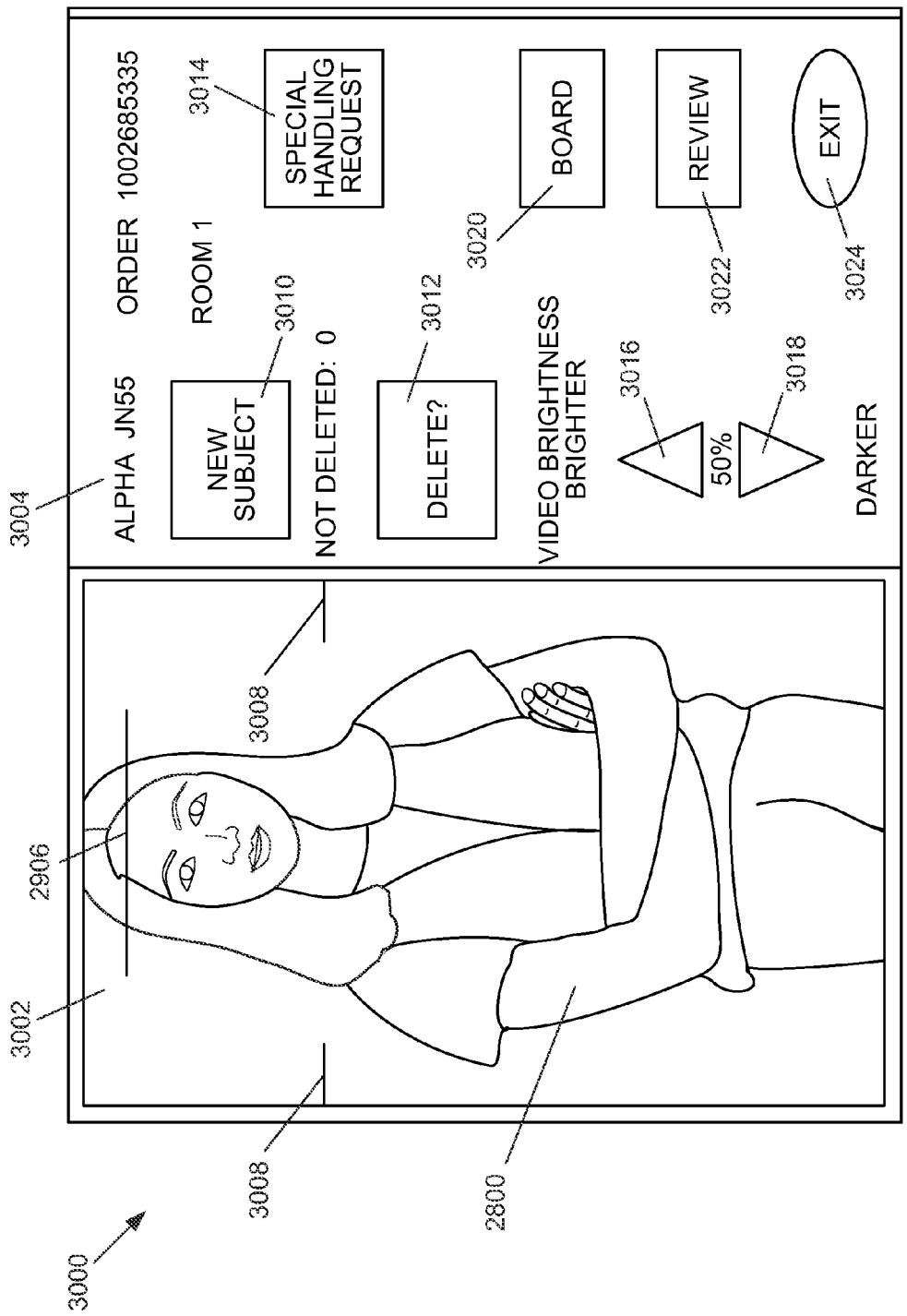
FIG. 32 is a screen shot of the example user interface shown in FIG. 30, showing a subject that is improperly positioned within the preview window.

FIG. 32 is an example screen shot of the user interface 3000, shown in FIG. 30, and further illustrating a subject that is not properly positioned within the preview window 3002. In this example, the top of the subject's head is above upper guide line 3006, rather than below guide line 3006.

As discussed above, in some embodiments photography module 704 performs a position check after a digital image is captured. The position check locates the upper-most point of the subject in the digital image. The photography module then determines whether the upper-most point is between the upper and lower guide lines 3006 and 3008. If not, an error is reported to the user, and the user is prompted to properly position the subject.

In some embodiments the upper-most point of the subject is identified as follows. First, two images are captured, including a front illuminated image and a background illuminated image. The front illuminated image is captured in some embodiments using main light 118, fill light 120, and sometimes hair light 124. The background illuminated image is captured in some embodiments using only the background light 126, causing the subject 2900 to be only a dark silhouette.

Using the background illuminated image, photography module 704 identifies the subject by locating all dark regions within the digital image. In some embodiments the resulting percentage of dark pixels to the total number of pixels is computed and checked to ensure that it is within a predetermined range of values, indicating that the subject is filling at least a minimum percentage of the image space and is not occupying more than a maximum percentage of the image space.

After the dark regions have been identified, the upper-most point of the subject is then identified. Once the upper-most point of the subject is identified, the photography module determines whether that point is below the position of the upper guide line 3006 and is above the position of the lower guide lines 3008. If so, the subject is determined to be properly positioned, in some embodiments. If not, the subject is determined to be improperly positioned, and an error is reported to the user, and the user is prompted to reposition the subject and try again.

Some embodiments perform other image checks. For example, in some embodiments the position of the subject in the digital images is checked to determine whether any portion of the subject 2900 extended all the way to the left or right edges of the digital image. This check can be performed by identifying the left-most and right-most points of the subject 2900 in the background illuminated image, similar to the process described above. If the left-most or right-most points of the subject 2900 are found to be at the extreme left or right edges of the digital image, an error is reported to the user. In some embodiments the error message prompts the user to reposition the subject and try again.

Another possible embodiment performs yet another image check. In this example, the position of the subject is checked to confirm that a portion of the subject does extend to the bottom of the digital image. If no portion of the subject is found at the bottom of the digital image, photography module 704 determines that an error has occurred, and an error is reported to the user.

Figure 33:
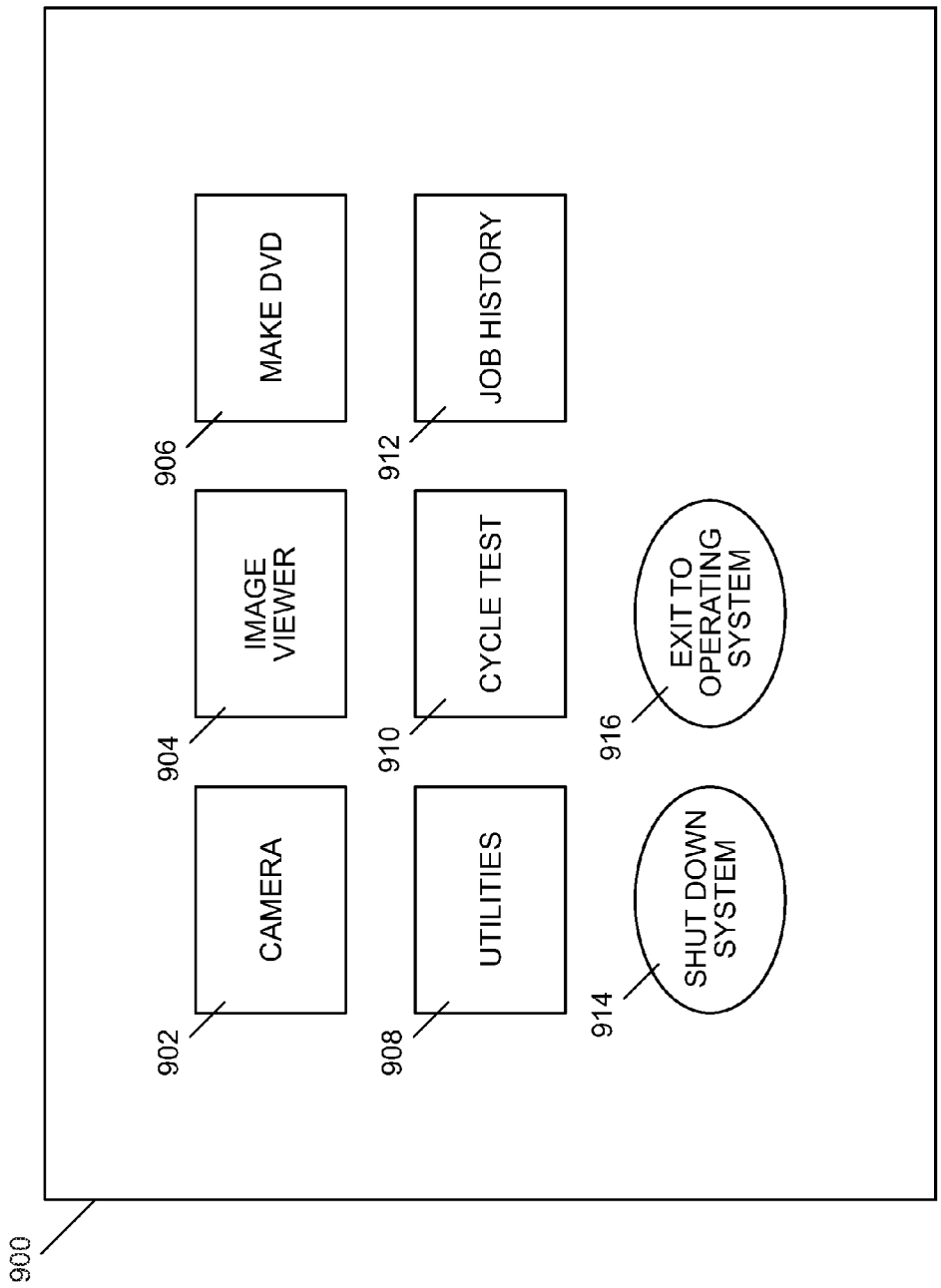
FIG. 33 is a screen shot of the user interface shown in FIG. 9.

After all digital images have been selected, exit button 3024 is selected to terminate the photography module 704, and user interface 900 is then displayed, as shown in FIG. 33.

Referring now to FIG. 7, in some embodiments, after the photography module 704 has completed, a data storage module 708 is executed to store the captured image data. The data storage module 708 is illustrated and described in more detail herein with reference to FIGS. 33-34.

FIG. 33 is a screen shot of the example user interface 900, previously described herein with reference to FIG. 9. After the photography module has completed the capturing digital images of all of the subjects, user interface 900 is displayed. If desired, the user can select storage button 906 to initiate the execution of the data storage module 708, shown in FIG. 7.

Figure 34:
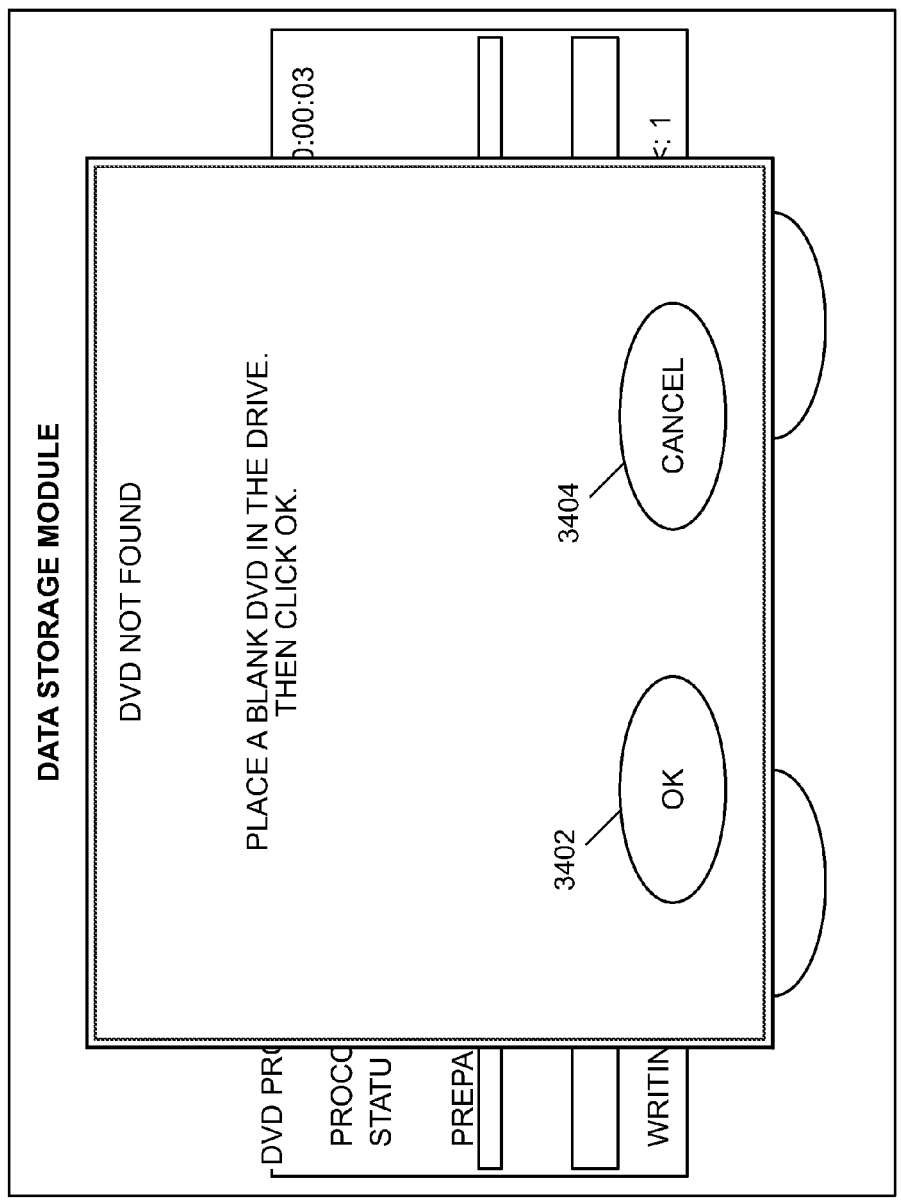
FIG. 34 is a screen shot of an example user interface of a data storage module.

The data storage module 708 then generates a user interface shown in FIG. 34.

FIG. 34 is a screen shot of an example user interface 3900, such as generated by a data storage module 708, shown in FIG. 7. In this example, the user interface prompts the user to place a blank DVD into a DVD burner drive of the computing device 110. After the DVD has been inserted into the drive, the user selects OK button 3902 to proceed. Otherwise, the user selects the cancel button 3904 to terminate the data storage module 708.

After the OK button has been selected, data storage module 708 begins to transfer captured image data onto the DVD. While the transfer is taking place, user interface 3900 is updated to show the status of the transfer.

Although this example refers to the storage of captured image data onto a DVD, other embodiments store the digital data on other computer-readable media. Alternatively, in some embodiments captured image data is transferred across a communication network and stored on in computer-readable media of a remote computing device. For example, in some embodiments captured image data is uploaded to a web server that is configured to receive the captured image data.

After the captured image data has been stored, the data storage module 706 is completed and method 700, shown in FIG. 7, comes to an end.

Referring now to FIG. 33, after data storage module 706 is completed, user interface 900 is again displayed. If the user wants to shut down the system, the shut down system button 914 is selected. Upon selection, the camera 106 and controller 108 are shut down. Exit to operating system button 916 is then selected by the user to terminate the software application.

In some embodiments, after the digital images have been captured and stored to a computer-readable media, one or more products are made using one or more of the digital images. Some examples of products include a photo mug, a picture book (i.e., yearbook, photo directory, etc.), a photograph (such as printed on a sheet of paper), a computer-readable medium storing digital image data, and digital images delivered across a communication network (such as the Internet). Other examples of products include a photo mouse pad, a collage, a key tag, a digital picture frame or digital key chain, a photo card (such as a student identification card, drivers license, holiday or greeting card, security badge, baseball or other sports card, luggage tag, etc.), a photo magnet, an ornament, a puzzle, a calendar, a tote bag, a photo keepsake box, a t-shirt, an apron, or a variety of other products including a photographic image.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A photography station comprising:
a background;
a background light arranged and configured to illuminate the background;
a foreground light arranged and configured to illuminate a subject;
a digital camera configured to capture digital images of the subject and the background;
a controller coupled to the background light, the foreground light, and the digital camera for synchronized operation; and
a computing device electrically coupled to the controller, the computing device including a processor and memory, the memory storing computer-executable instructions, which when executed by the processor generate modules including:
a setup module operable to perform tests on test images captured by the digital camera to check a configuration of the photography station, wherein each test includes an initial checking operation and a background processing operation, and wherein each of the initial checking operations are performed consecutively, and wherein the background processing operations are performed substantially simultaneous to at least some of the initial processing operations; and
a photography module operable to capture digital images of the subject.

2. The photography station of claim 1, wherein the plurality of initial checking operations includes a first initial checking operation and a second initial checking operation, and the plurality of background processing operations includes a first background processing operation that is performed after the first initial processing operation has completed successfully.

3. The photography station of claim 2, wherein the second initial checking operation is performed in parallel with the first background processing operation.

4. The photography station of claim 2, wherein the first initial checking operation confirms the presence of a gray card assembly within a first gray card test image, and wherein the first background processing operation is operable to evaluate colors of a gray card of the gray card assembly within the first gray card test image.

5. The photography station of claim 4, wherein the first background processing operation is further operable to determine whether the camera is in focus.

6. The photography station of claim 4, wherein the second initial checking operation is operable to check a background in a background test image.

7. The photography station of claim 1, wherein the plurality of initial checking operations are selected from the group consisting of a gray card calibration operation, a background light check operation, a main light check operation, a fill light check operation, a hair light check operation, a background calibration operation, a dust check operation, a shutter check operation, and a system check operation.

8. The photography station of claim 1, wherein the plurality of background processing operations are selected from the group consisting of a gray card calibration operation, a background calibration operation, a dust check operation, a shutter check operation, a camera focus check operation, and a system check operation.

9. The photography station of claim 1, wherein the setup module is operable to identify an error in an equipment configuration of the photography station, and when the error is detected to alert the user to the error.

10. The photography station of claim 9, wherein the error in an equipment configuration is selected from the group consisting of a main light error, a fill light error, a background light error, a hair light error, a gray card error, and a background error.

11. The photography station of claim 10, wherein the setup module operates to block execution of the photography module until the setup module determines that the error has been corrected.

12. The photography station of claim 1, further comprising a data storage module operable to store the digital images captured by the photography module on a computer-readable storage medium.

13. The photography station of claim 1, wherein the photography module is further operable to process the captured digital images, wherein processing the captured digital images comprises:
checking a position of the subject to confirm that the subject is properly positioned within the digital image;
checking equipment operation to confirm that equipment functioned properly when the digital image was captured; and
generating an adjusted image by removing a visible portion of the background from the digital image and adjusting at least one property of the digital image, wherein the property is selected from a color balance and a brightness.

14. The photography station of claim 13, wherein checking equipment operation further comprises checking whether the background light fired.

15. A method of checking a configuration of a photography station, the method comprising:
performing a first test, the first test comprising:
generating a first user interface with a computing device, the first user interface prompting a user to perform at least one first action;
capturing with a digital camera at least one first test image after the at least one first action;
performing a first initial check of the at least one first test image; and if the first initial check is completed successfully, performing further processing of the at least one first test image; and
performing a second test, the second test comprising:
generating a second user interface with the computing device before the further processing of the at least one first test image is completed, the second user interface prompting the user to perform at least one second action;
capturing with the digital camera at least one second test image after the at least one second action;
performing a second initial check on the at least one second test image; and
if the second initial check is completed successfully, performing further processing of the at least one second test image.

16. The method of claim 15, wherein the first initial check is performed in less than 5 seconds.

17. The method of claim 16, wherein the further processing of the at least one first test image is performed in the background on the computing device without user interaction.

18. The method of claim 15, wherein the at least one first action comprises:
adjusting a zoom of a digital camera;
adjusting the height of the digital camera; and
pressing a button to initiate the capturing of the at least one first test image.

19. The method of claim 16, wherein adjusting the height of the digital camera is performed until at least one graphical element shown in the graphical user interface is in a predetermined position.

* * * * *